US010461915B2

(12) United States Patent
Yi

(10) Patent No.: US 10,461,915 B2
(45) Date of Patent: Oct. 29, 2019

(54) METHOD AND APPARATUS FOR HANDLING TDD FRAME FOR SHORT TTI IN WIRELESS COMMUNICATION SYSTEM

(71) Applicant: LG ELECTRONICS INC., Seoul (KR)

(72) Inventor: Yunjung Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/743,644

(22) PCT Filed: Jul. 20, 2016

(86) PCT No.: PCT/KR2016/007909
§ 371 (c)(1),
(2) Date: Jan. 10, 2018

(87) PCT Pub. No.: WO2017/014560
PCT Pub. Date: Jan. 26, 2017

(65) Prior Publication Data
US 2018/0205534 A1    Jul. 19, 2018

Related U.S. Application Data

(60) Provisional application No. 62/316,575, filed on Apr. 1, 2016, provisional application No. 62/294,291, filed on Feb. 11, 2016, provisional application No. 62/264,320, filed on Dec. 8, 2015, provisional application No. 62/194,799, filed on Jul. 20, 2015.

(51) Int. Cl.
*H04L 5/14* (2006.01)
*H04L 1/18* (2006.01)
(Continued)

(52) U.S. Cl.
CPC .......... *H04L 5/1469* (2013.01); *H04L 1/1812* (2013.01); *H04L 5/0055* (2013.01); *H04W 72/0446* (2013.01)

(58) Field of Classification Search
CPC .......... H04W 72/042; H04W 72/0446; H04W 48/00; H04W 72/0413; H04W 28/06;
(Continued)

(56) References Cited

U.S. PATENT DOCUMENTS

2013/0077606 A1    3/2013  Wu et al.
2014/0293843 A1*  10/2014  Papasakellariou .. H04W 72/042
                                                                      370/280
(Continued)

FOREIGN PATENT DOCUMENTS

WO        2014056643         4/2014

OTHER PUBLICATIONS

PCT International Application No. PCT/KR2016/007909, International Search Report dated Oct. 18, 2016, 2 pages.
(Continued)

*Primary Examiner* — Jung Liu
(74) *Attorney, Agent, or Firm* — Lee Hong Degerman Kang Waimey

(57) ABSTRACT

A method and apparatus for communicating with a user equipment via a time division duplex (TDD) frame using a short transmission time interval (TTI) in a wireless communication system is provided. An eNodeB (eNB) configures the TDD frame including a set of short downlink (DL) TTIs and a set of short uplink (UL) TTIs, and communicates with the UE via the TDD frame. A length of a short DL TTI and a short UL TTI is less than 1 ms.

18 Claims, 28 Drawing Sheets

(51) Int. Cl.
*H04L 5/00* (2006.01)
*H04W 72/04* (2009.01)

(58) Field of Classification Search
CPC ........... H04W 52/325; H04W 72/1289; H04W 52/243; H04W 52/04; H04W 52/146; H05K 999/99; H04L 5/14; H04L 1/1864; H04L 5/0037; H04L 1/00; H04L 5/0053
See application file for complete search history.

(56) References Cited

U.S. PATENT DOCUMENTS

2014/0348050 A1    11/2014  Kim et al.
2015/0146604 A1     5/2015  Kim et al.
2016/0249329 A1*    8/2016  Au ........................ H04W 48/00

OTHER PUBLICATIONS

Ericsson, "Areas for reducing latency", 3GPP TSG RAN WG2 Meeting #90, R2-152415, May 2015, 6 pages.
LG Electronics, "Potential Improvement Area for Latency Reduction", 3GPP TSG RAN WG2 Meeting #90, R2-152293, May 2015, 6 pages.
Huawei, "Evaluation on the gains provided by 0.5ms TTI", 3GPP TSG RAN WG2 Meeting #90, R2-152456, May 2015, 11 pages.
PCT International Application No. PCT/KR2016/007904, International Search Report dated Oct. 18, 2016, 6 pages.

* cited by examiner

METHOD AND APPARATUS FOR HANDLING TDD FRAME FOR SHORT TTI IN WIRELESS COMMUNICATION SYSTEM

CROSS-REFERENCE TO RELATED APPLICATIONS

This application is the National Stage filing under 35 U.S.C. 371 of International Application No. PCT/KR2016/007909, filed on Jul. 20, 2016, which claims the benefit of U.S. Provisional Application No. 62/194,799, filed on Jul. 20, 2015, 62/264,320, filed on Dec. 8, 2015, 62/294,291, filed on Feb. 11, 2016, and 62/316,575, filed on Apr. 1, 2016, the contents of which are all hereby incorporated by reference herein in their entirety.

BACKGROUND OF THE INVENTION

Field of the Invention

The present invention relates to wireless communications, and more particularly, to a method and apparatus for handling time division duplex (TDD) frames for a short transmission time interval (TTI) in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Packet data latency is one of the performance metrics that vendors, operators and also end-users (via speed test applications) regularly measure. Latency measurements are done in all phases of a radio access network system lifetime, when verifying a new software release or system component, when deploying a system and when the system is in commercial operation. Better latency than previous generations of 3GPP radio access technologies (RATs) was one performance metric that guided the design of LTE. LTE is also now recognized by the end-users to be a system that provides faster access to internet and lower data latencies than previous generations of mobile radio technologies. In the 3GPP, much effort has been put into increasing data rates from the first release of LTE (Rel-8) until the most recent one (Rel-12). However, with regard to further improvements specifically targeting the delays in the system little has been done.

Packet data latency is important not only for the perceived responsiveness of the system, but it is also a parameter that indirectly influences the throughput. In addition, to achieve really high bit rates, UE L2 buffers need to be dimensioned correspondingly. The longer the round trip time (RTT) is, the bigger the buffers need to be. The only way to reduce buffering requirements in the UE and eNB side is to reduce latency. Further, radio resource efficiency could also be positively impacted by latency reductions. Lower packet data latency could increase the number of transmission attempts possible within a certain delay bound, hence higher block error rate (BLER) targets could be used for the data transmissions, freeing up radio resources but still keeping the same level of robustness for users in poor radio conditions. The increased number of possible transmissions within a certain delay bound, could also translate into more robust transmissions of real-time data streams (e.g. voice over LTE (VoLTE)), if keeping the same BLER target. This may improve the VoLTE voice system capacity.

Various pre-scheduling strategies can be used to lower the latency to some extent, but similarly to shorter scheduling request (SR) interval introduced in Rel-9, they do not necessarily address all efficiency aspects. Accordingly, various techniques to reduce latency have been discussed. Specifically, as for one of techniques to reduce latency, a short transmission time interval (TTI) has been discussed.

SUMMARY OF THE INVENTION

The present invention provides a method and apparatus for handling time division duplex (TDD) frames for a short transmission time interval (TTI) in a wireless communication system. The present invention provides a method and apparatus for handling unavailable subframes for a short TTI in a backward compatible manner.

In an aspect, a method for communicating, by an eNodeB (eNB), with a user equipment via a time division duplex (TDD) frame using a short transmission time interval (TTI) in a wireless communication system is provided. The method includes configuring the TDD frame including a set of short downlink (DL) TTIs and a set of short uplink (UL) TTIs, and communicating with the UE via the TDD frame. A length of a short DL TTI and a short UL TTI is less than 1 ms.

In another aspect, an eNodeB (eNB) in a wireless communication system is provided. The eNB includes a memory, a transceiver, and a processor, coupled to the memory and the transceiver, that configures a time division duplex (TDD) including a set of short downlink (DL) transmission time intervals (TTIs) and a set of short uplink (UL) TTIs, and controls the transceiver to communicate with the UE via the TDD frame. A length of a short DL TTI and a short UL TTI is less than 1 ms.

Unavailable subframes in a TDD frame for short TTI transmission can be handled efficiently.

DESCRIPTION OF EXEMPLARY EMBODIMENTS

Techniques, apparatus and systems described herein may be used in various wireless access technologies such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented with a radio technology such as universal terrestrial radio access (UTRA) or CDMA2000. The TDMA may be implemented with a radio technology such as global system for mobile communications (GSM)/general packet radio service (GPRS)/enhanced data rates for GSM evolution (EDGE). The OFDMA may be implemented with a radio technology such as institute of electrical and electronics engineers (IEEE) 802.11 (Wi-Fi), IEEE 802.16 (WiMAX), IEEE 802-20, evolved-UTRA (E-UTRA) etc. The UTRA is a part of a universal mobile telecommunication system (UMTS). 3rd generation partnership project (3GPP) long term evolution (LTE) is a part of an evolved-UMTS (E-UMTS) using the E-UTRA. The 3GPP LTE employs the OFDMA in downlink (DL) and employs the SC-FDMA in uplink (UL). LTE-advance (LTE-A) is an evolution of the 3GPP LTE. For clarity, this application focuses on the 3GPP LTE/LTE-A. However, technical features of the present invention are not limited thereto.

Figure 1:
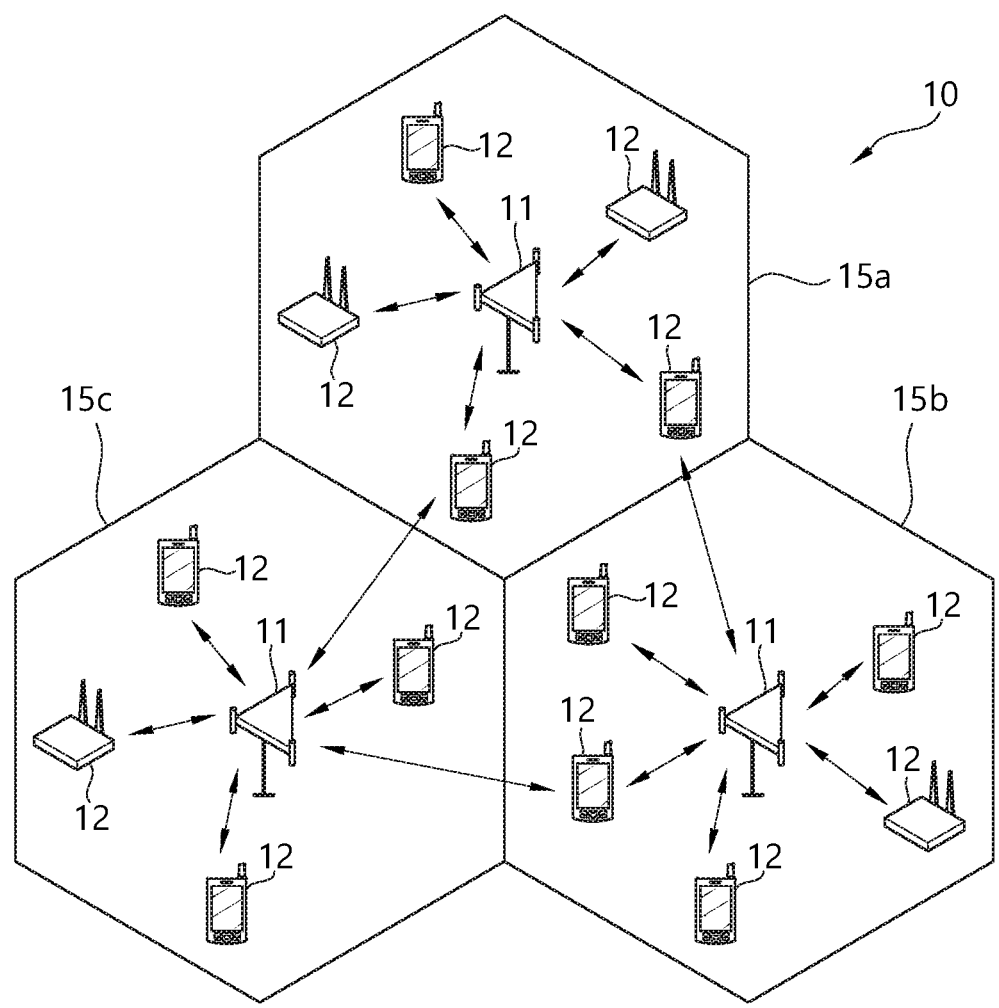
FIG. 1 shows a wireless communication system.

FIG. 1 shows a wireless communication system. The wireless communication system 10 includes at least one evolved NodeB (eNB) 11. Respective eNBs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as mobile station (MS), mobile terminal (MT), user terminal (UT), subscriber station (SS), wireless device, personal digital assistant (PDA), wireless modem, handheld device. The eNB 11 generally refers to a fixed station that communicates with the UE 12 and may be called by other names such as base station (BS), base transceiver system (BTS), access point (AP), etc.

In general, a UE belongs to one cell, and the cell to which a UE belongs is called a serving cell. An eNB providing a communication service to the serving cell is called a serving eNB. The wireless communication system is a cellular system, so a different cell adjacent to the serving cell exists. The different cell adjacent to the serving cell is called a neighbor cell. An eNB providing a communication service to the neighbor cell is called a neighbor eNB. The serving cell and the neighbor cell are relatively determined based on a UE.

This technique can be used for DL or UL. In general, DL refers to communication from the eNB 11 to the UE 12, and UL refers to communication from the UE 12 to the eNB 11. In DL, a transmitter may be part of the eNB 11 and a receiver may be part of the UE 12. In UL, a transmitter may be part of the UE 12 and a receiver may be part of the eNB 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

Figure 2:
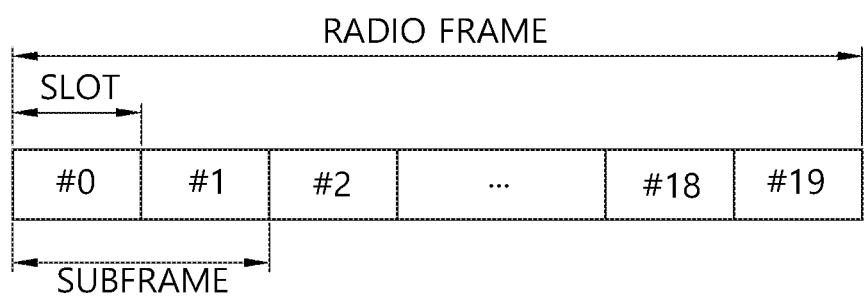
FIG. 2 shows structure of a radio frame of 3GPP LTE.

FIG. 2 shows structure of a radio frame of 3GPP LTE. Referring to FIG. 2, a radio frame includes 10 subframes. A subframe includes two slots in time domain. A time for transmitting one transport block by higher layer to physical layer (generally over one subframe) is defined as a transmission time interval (TTI). For example, one subframe may have a length of 1 ms, and one slot may have a length of 0.5 ms. One slot includes a plurality of orthogonal frequency division multiplexing (OFDM) symbols in time domain. Since the 3GPP LTE uses the OFDMA in the DL, the OFDM symbol is for representing one symbol period. The OFDM symbols may be called by other names depending on a multiple-access scheme. For example, when SC-FDMA is in use as a UL multi-access scheme, the OFDM symbols may be called SC-FDMA symbols. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

The wireless communication system may be divided into a frequency division duplex (FDD) scheme and a time division duplex (TDD) scheme. According to the FDD scheme, UL transmission and DL transmission are made at different frequency bands. According to the TDD scheme, UL transmission and DL transmission are made during different periods of time at the same frequency band. A channel response of the TDD scheme is substantially reciprocal. This means that a DL channel response and a UL channel response are almost the same in a given frequency band. Thus, the TDD-based wireless communication system is advantageous in that the DL channel response can be obtained from the UL channel response. In the TDD scheme, the entire frequency band is time-divided for UL and DL transmissions, so a DL transmission by the eNB and a UL transmission by the UE cannot be simultaneously performed. In a TDD system in which a UL transmission and a DL transmission are discriminated in units of subframes, the UL transmission and the DL transmission are performed in different subframes.

Figure 3:
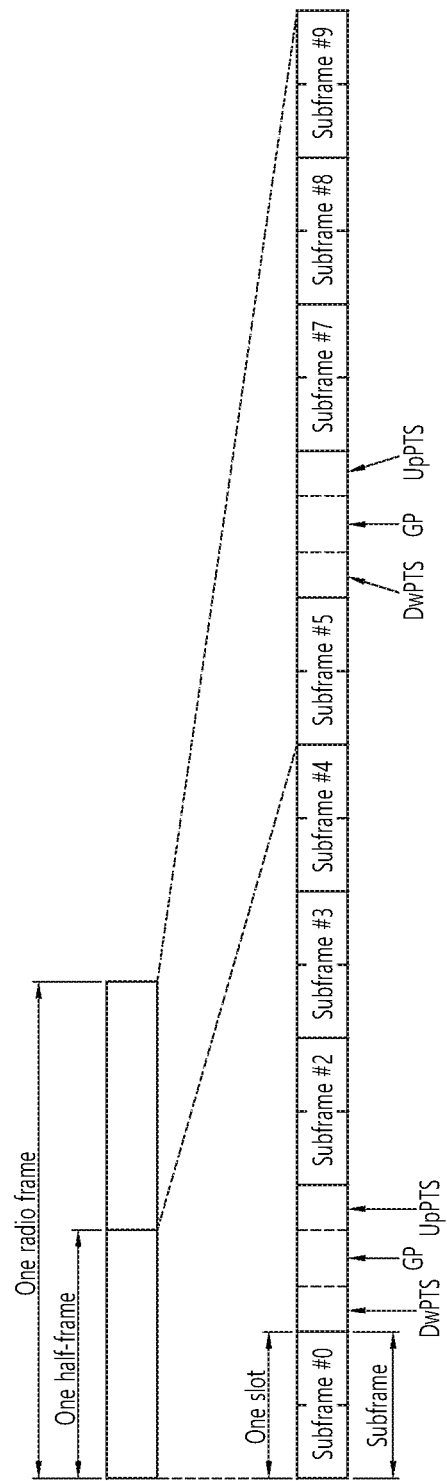
FIG. 3 shows another structure of a radio frame of 3GPP LTE.

FIG. 3 shows another structure of a radio frame of 3GPP LTE. Frame structure described in FIG. 3 is applicable to TDD. Each radio frame of length 10 ms consists of two half-frames of length 5 ms each. Each half-frame consists of five subframes of length 1 ms. Each subframe i is defined as two slots, 2i and 2i+1, of length 0.5 ms each.

The UL-DL configuration in a cell may vary between frames and controls in which subframes UL or DL transmissions may take place in the current frame. The supported UL-DL configurations are listed in Table 1 below.

TABLE 1

| UL-DL config-uration | DL-to-UL Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, for each subframe in a radio frame, "D" denotes a DL subframe reserved for DL transmissions, "U" denotes an UL subframe reserved for UL transmissions and "S" denotes a special subframe with the three fields downlink pilot time slot (DwPTS), guard period (GP) and uplink pilot time slot (UpPTS). UL-DL configurations with both 5 ms and 10 ms DL-to-UL switch-point periodicity are supported. In case of 5 ms DL-to-UL switch-point periodicity, the special subframe exists in both half-frames. In case of 10 ms DL-to-UL switch-point periodicity, the special subframe exists in the first half-frame only. Subframes 0 and 5 and DwPTS are always reserved for DL transmission. UpPTS and the subframe immediately following the special subframe are always reserved for UL transmission.

Figure 4:
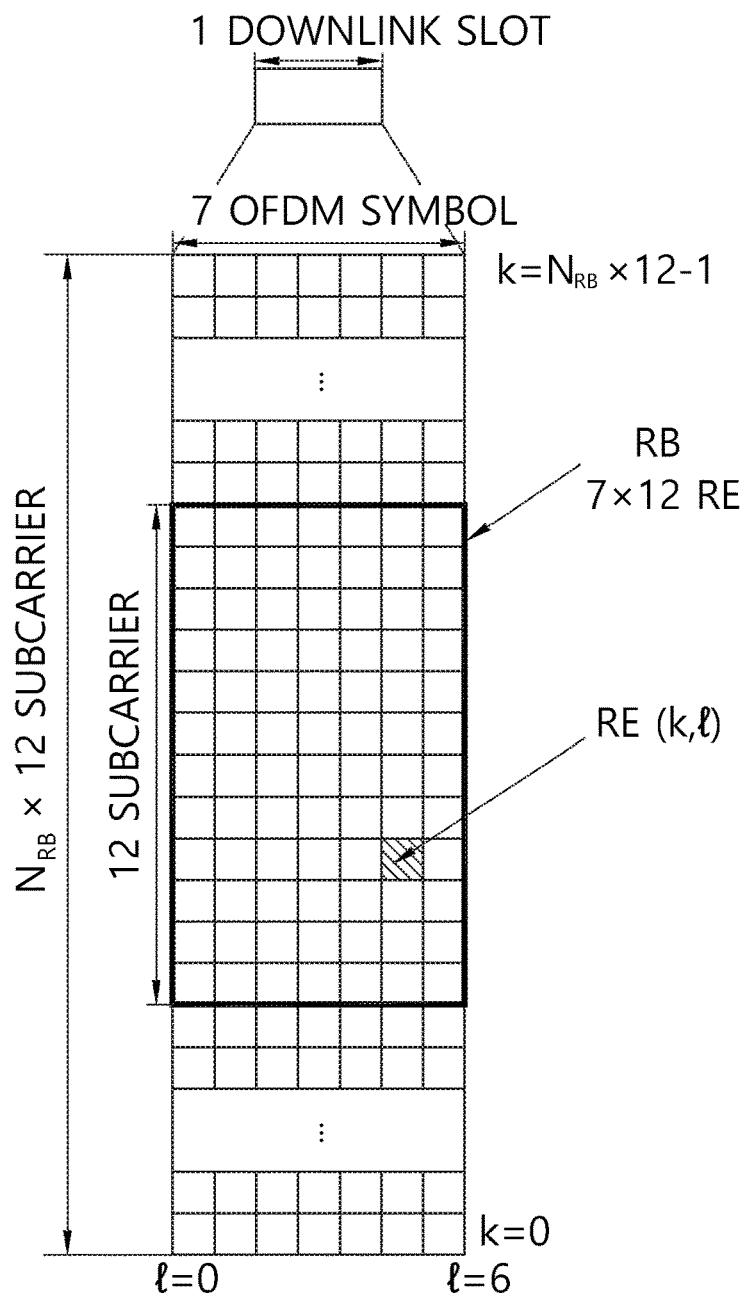
FIG. 4 shows a resource grid for one downlink slot.

FIG. 4 shows a resource grid for one downlink slot. Referring to FIG. 4, a DL slot includes a plurality of OFDM symbols in time domain. It is described herein that one DL slot includes 7 OFDM symbols, and one RB includes 12 subcarriers in frequency domain as an example. However, the present invention is not limited thereto. Each element on the resource grid is referred to as a resource element (RE). One RB includes 12×7 resource elements. The number NDL of RBs included in the DL slot depends on a DL transmit bandwidth. The structure of a UL slot may be same as that of the DL slot. The number of OFDM symbols and the number of subcarriers may vary depending on the length of a CP, frequency spacing, etc. For example, in case of a normal cyclic prefix (CP), the number of OFDM symbols is 7, and in case of an extended CP, the number of OFDM symbols is 6. One of 128, 256, 512, 1024, 1536, and 2048 may be selectively used as the number of subcarriers in one OFDM symbol.

Figure 5:
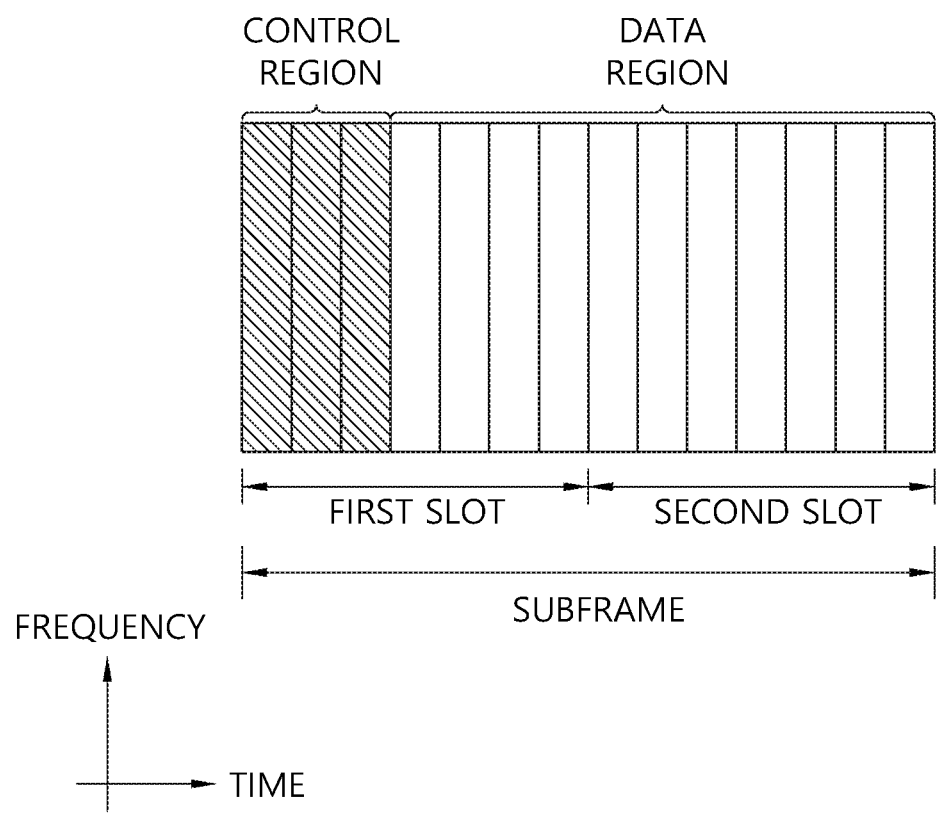
FIG. 5 shows structure of a downlink subframe.

FIG. 5 shows structure of a downlink subframe. Referring to FIG. 5, a maximum of three OFDM symbols located in a front portion of a first slot within a subframe correspond to a control region to be assigned with a control channel. The remaining OFDM symbols correspond to a data region to be assigned with a physical downlink shared chancel (PDSCH). Examples of DL control channels used in the 3GPP LTE includes a physical control format indicator channel (PCFICH), a physical downlink control channel (PDCCH), a physical hybrid automatic repeat request (HARQ) indicator channel (PHICH), etc. The PCFICH is transmitted at a first OFDM symbol of a subframe and carries information regarding the number of OFDM symbols used for transmission of control channels within the subframe. The PHICH is a response of UL transmission and carries a HARQ acknowledgment (ACK)/non-acknowledgment (NACK) signal. Control information transmitted through the PDCCH is referred to as downlink control information (DCI). The DCI includes UL or DL scheduling information or includes a UL transmit (TX) power control command for arbitrary UE groups.

The PDCCH may carry a transport format and a resource allocation of a downlink shared channel (DL-SCH), resource allocation information of an uplink shared channel (UL-SCH), paging information on a paging channel (PCH), system information on the DL-SCH, a resource allocation of an upper-layer control message such as a random access response transmitted on the PDSCH, a set of TX power control commands on individual UEs within an arbitrary UE group, a TX power control command, activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups.

Figure 6:
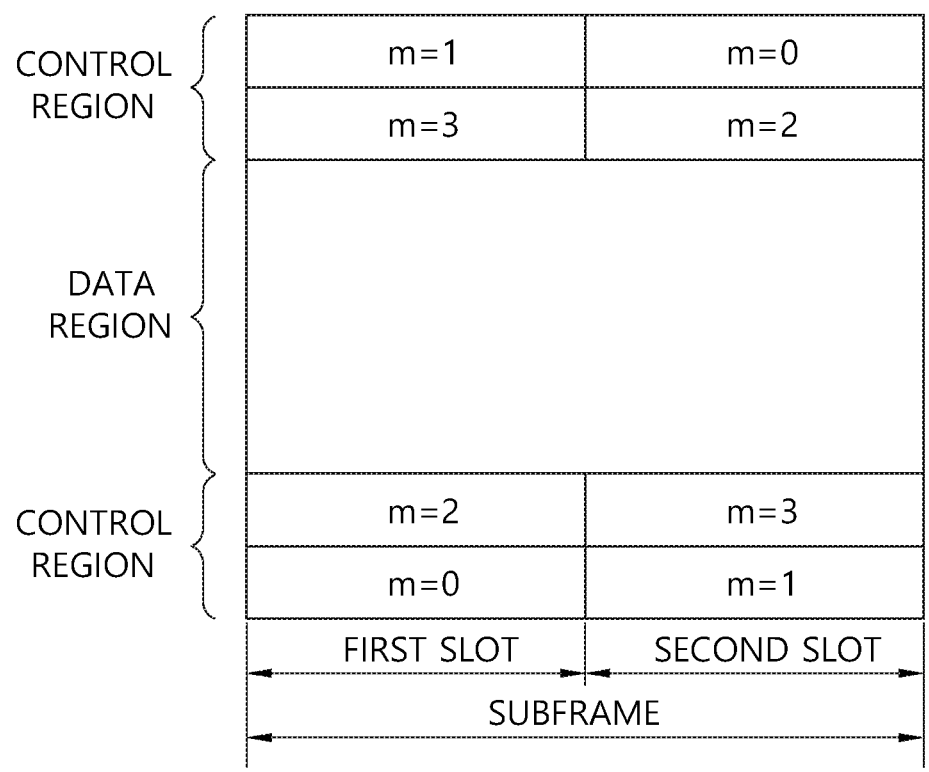
FIG. 6 shows structure of an uplink subframe.

FIG. 6 shows structure of an uplink subframe. Referring to FIG. 6, a UL subframe can be divided in a frequency domain into a control region and a data region. The control region is allocated with a physical uplink control channel (PUCCH) for carrying UL control information. The data region is allocated with a physical uplink shared channel (PUSCH) for carrying user data. When indicated by a higher layer, the UE may support a simultaneous transmission of the PUSCH and the PUCCH. The PUCCH for one UE is allocated to an RB pair in a subframe. RBs belonging to the RB pair occupy different subcarriers in respective two slots. This is called that the RB pair allocated to the PUCCH is frequency-hopped in a slot boundary. This is said that the pair of RBs allocated to the PUCCH is frequency-hopped at the slot boundary. The UE can obtain a frequency diversity gain by transmitting UL control information through different subcarriers according to time.

UL control information transmitted on the PUCCH may include a HARQ ACK/NACK, a channel quality indicator (CQI) indicating the state of a DL channel, a scheduling request (SR), and the like. The PUSCH is mapped to a UL-SCH, a transport channel. UL data transmitted on the PUSCH may be a transport block, a data block for the UL-SCH transmitted during the TTI. The transport block may be user information. Or, the UL data may be multiplexed data. The multiplexed data may be data obtained by multiplexing the transport block for the UL-SCH and control information. For example, control information multiplexed to data may include a CQI, a precoding matrix indicator (PMI), an HARQ, a rank indicator (RI), or the like. Or the UL data may include only control information.

A subset of the DL subframes in a radio frame on a carrier supporting PDSCH transmission can be configured as multicast-broadcast single-frequency network (MBSFN) subframes by higher layers. Each MBSFN subframe is divided into a non-MBSFN region and an MBSFN region. The non-MBSFN region spans the first one or two OFDM symbols in an MBSFN subframe. The MBSFN region in an MBSFN subframe is defined as the OFDM symbols not used for the non-MBSFN region. MBSFN is supported for the multicast control channel (MCH), which is a transport channel. Multiplexing of transport channels using MBSFN and non-MBSFN transmission is done on a per-sub-frame basis. Additional reference symbols, transmitted using MBSFN are transmitted within MBSFN subframes.

In an LTE system, there are multiple components contributing to the total end to end delay for connected UEs. The limitations in performance are in general use case dependent, for which, e.g. UL latency may influence the DL application performance and vice versa. Examples of sources to latency are listed below.

(1) Grant acquisition: A UE with data to send must send a SR and receive a scheduling grant before transmitting the data packet. In order to send a SR, it must wait for a SR-valid PUCCH resource and a corresponding scheduling grant transmitted to the UE in response. When the grant is decoded the data transmission can start over PUSCH.

(2) Random access: If the UL timing of a UE is not aligned, initial time alignment is acquired with the random access procedure. The time alignment can be maintained with timing advance commands from the eNB to the UE. However, it may be desirable to stop the maintenance of UL time alignment after a period of inactivity, thus the duration of the random access procedure may contribute to the overall latency in RRC_CONNECTED. The random access procedure also serves as an UL grant acquisition mechanism (random access based scheduling request). Therefore, for cases where random access is needed, no separate PUCCH based SR procedure/step is needed.

(3) TTI: The transmission of a request, grant, or data is done in subframe chunks with a fixed duration (1 ms), which is the source of a delay per packet exchange between the UE and the eNB.

(4) Processing: Data and control need to be processed (e.g. encoded and decoded) in the UE and eNB. Data processing is a source of processing delays, which are proportional to the transport block (TB) size. The processing of control information is typically less dependent on TB size.

(5) HARQ round trip time (RTT): For UL transmission in FDD, the HARQ ACK for a packet received by the eNB in subframe n is reported in subframe n+4. If a retransmission is needed by the UE, this is done in subframe n+8. Thus, the HARQ RTT is 8 ms for FDD UL. For TDD, RTT depends on TDD configuration. The RTT for DL transmissions is not specified in detail, as the HARQ scheme is asynchronous. The HARQ feedback is available at subframe n+4 in FDD, and retransmissions can typically be scheduled in subframe n+8 or later if needed.

(6) Core/Internet: In the core network, packets can be queued due to congestion and delayed due to transmission over backhaul links. Internet connections can be congested and therefore add to the experienced end-to-end packet delay. EPC and/or Internet delays vary widely. In the context of latency reductions, it is reasonable to assume that latency performance of the transport links is good.

For example, Table 2 shows a typical radio access latency components for a UL transmission from a UE without a valid UL grant.

TABLE 2

| Component | Description | Time (ms) |
|---|---|---|
| 1 | Average waiting time for PUCCH (10 ms SR period/1 ms SR period) | 5/0.5 |
| 2 | UE sends SR on PUCCH | 1 |
| 3 | eNB decodes SR and generates the scheduling grant | 3 |
| 4 | Transmission of scheduling grant | 1 |
| 5 | UE processing delay (decoding of scheduling grant + L1 encoding of UL data) | 3 |
| 6 | Transmission of UL data | 1 |
| 7 | Data decoding in eNB | 3 |
| | Total delay (ms) | 17/12.5 |

Referring to Table 2, assuming Rel-8 functionality, the average waiting time for a PUCCH at a periodicity of 10 ms is 5 ms, leading to a radio access latency sum of 17 ms. With a SR period set to 1 ms, the average waiting time is reduced to 0.5 ms, which would lead to a sum of 12.5 ms.

Table 3 shows a typical radio access latency components for a DL transmission.

TABLE 3

| Component | Description | Time (ms) |
|---|---|---|
| 1 | Processing incoming data | 3 |
| 2 | TTI alignment | 0.5 |
| 3 | Transmission of DL data | 1 |
| 4 | Data decoding in UE | 3 |
| | Total delay (ms) | 7.5 |

From the tables, it can be seen that grant acquisition delay, transmission and data processing times are additive.

Figure 7:
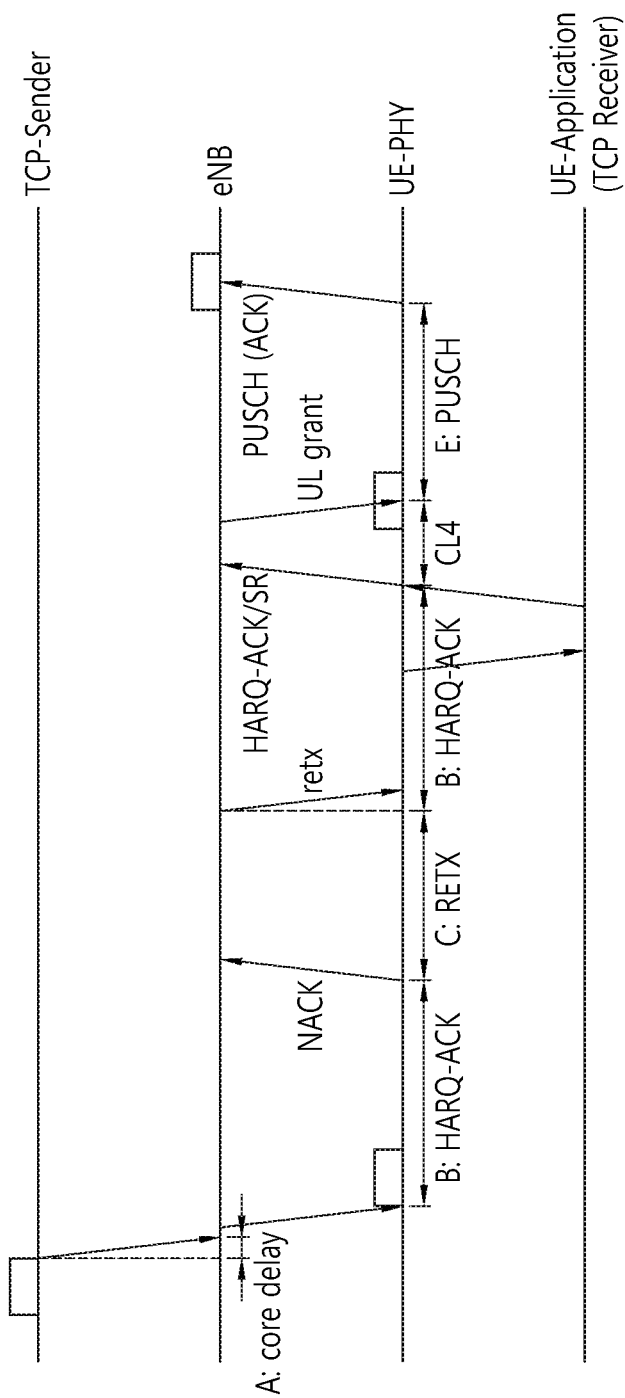
FIG. 7 shows an example of typical radio access latency components.

FIG. 7 shows an example of typical radio access latency components. Referring to FIG. 7, the latency of one transmission control protocol (TCP) segment latency may be represented as core delay (A)+HARQ-ACK feedback latency (B)+0.1*retransmission latency (C)+0.1*HARQ- ACK feedback latency (B)+eNB processing delay (D)+ PUSCH transmission delay (E). Among these components of latency, HARQ-ACK feedback latency (B), retransmission latency (C) and PUSCH transmission delay (E) may relate to a length of TTI. Roughly, it may be assumed that 4*TTIs are used for B and C and 3*TTIs are used for E. Accordingly, total 11*TTIs may be assumed for B+C+E. If any unavailability due to MBSFN subframe or TDD configuration is not considered, the overall latency of B, C and E can be linearly decreased with short TTI. Though the latency of one packet becomes smaller as the TCP window size gets larger, the length of TTI may impact the overall latency.

In TDD, delay computation may become challenging, as B, C and E may be decided dependent on UL-DL configurations shown in Table 1. For example, if UL-DL configuration 0 is used, the maximum gap of retransmission latency (C) may be larger than 3 ms (from a special subframe to the next DL subframe) which may not be further reduced unless DL subframes using short TTI are placed in between. For another example, if UL-DL configuration 5 is used, the maximum gap of PUSCH transmission may be larger than 8 ms (from subframe 3 to the next radio frame's first UpPTS) unless UL subframes using short TTI are placed in between.

Accordingly, in order to reduce latency, short TTI which is shorter than current TTI (i.e. 1 ms) may be proposed. For example, if it is assumed that the short TTI is 0.2 ms and RTT from the data transmission to the HARQ-ACK is 8*TTI, the overall latency between the data transmission to HARQ-ACK reception may be reduced to 1.6 msec. Furthermore, the short TTI may be designed such that a carrier where the short TTI is used can be accessed by a legacy UE which does not understand a frame structure for the short TTI. When a short TTI is introduced for latency reduction in LTE, E-UTRAN may be configured with both normal TTI with 1 ms and short TTI with a value less than 1 ms, such as 1 symbol or 0.5 ms.

The latency reduction by the short TTI may be fully achieved when all subframes are available for the short TTI, i.e. subframes using the short TTI are placed consecutively. Otherwise, the latency reduction by the short TTI cannot be fully achieved. For example, HARQ-ACK cannot be transmitted due to unavailable UL subframes or PHICH cannot be transmitted due to unavailable DL subframes (such as MBSFN subframes). In this case, the latency may not be reduced substantially.

The present invention discusses handling TDD cases for short TTI. Hereinafter, unless mentioned otherwise, a TTI may be referred to as a short TTI. The current TTI may be referred to as a legacy TTI.

1. TDD Handling with Keeping Legacy UL-DL Configuration

For handling unavailable subframes for short TTI transmission in TDD case, a method for keeping legacy UL-DL configuration, i.e. legacy switching points, may be proposed according to an embodiment of the present invention. If the legacy switching points are kept, some of UL-DL configurations (e.g. UL-DL configuration 0 or 5) may lead potentially large latency regardless of the length of short TTI, due to the large value between two available resources for short PDCCH (sPDCCH)/short PDSCH (sPDSCH)/short PUCCH (sPUCCH)/short PUSCH (sPUSCH) transmissions. However, this approach offers the simplest and cleanest solution, because this approach does not introduce any additional inter-cell interference issue for short TTI. To balance UL and DL portion, utilizing UL-DL configuration and configuring special subframe configuration with minimum DwPTS length and increase of UpPTS region to allow more UL resources may be considered.

Figure 8:
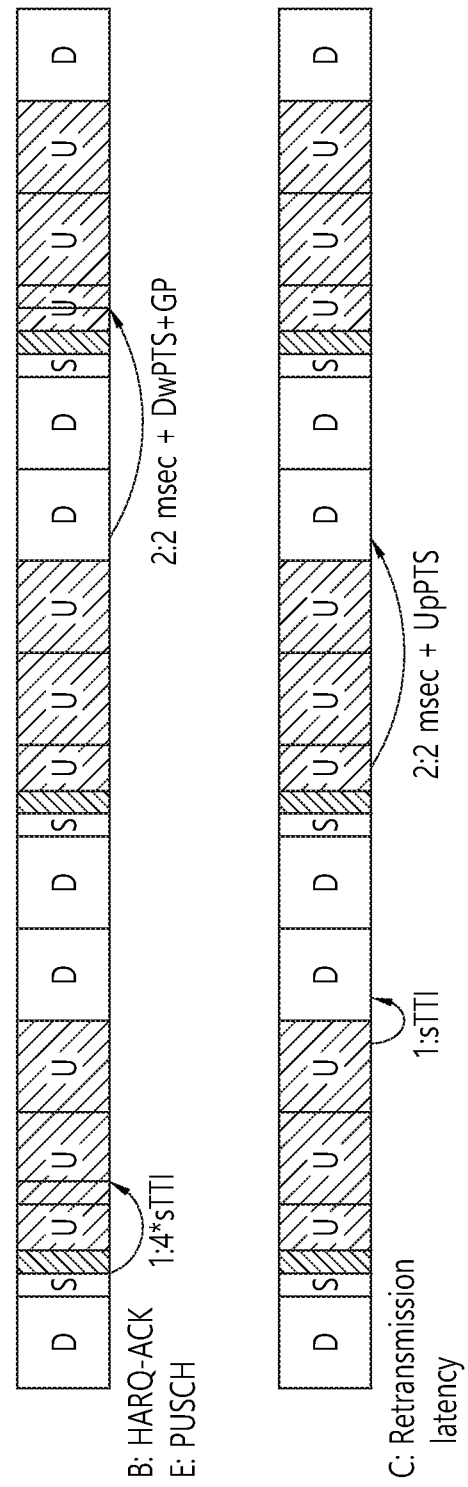
FIG. 8 shows an example of the best and worst latency for TDD according to an embodiment of the present invention.

FIG. 8 shows an example of the best and worst latency for TDD according to an embodiment of the present invention. The best and worst latency for HARQ-ACK feedback latency (B) and PUSCH transmission delay (E) may be 4*TTI and 2 ms+GP+DwPTS, respectively. The best and worst latency for retransmission latency (C) may be 1*TTI and 2 ms+UpPTS, respectively. In legacy, the best and worst latency for HARQ-ACK feedback latency (B) and PUSCH transmission delay (E) may be 4 ms and 6 ms, respectively, and the best and worst latency for retransmission latency (C) be 2 ms and 6 ms, respectively. Roughly, the latency for the worst case may be reduced to 50% with introducing short TTIs and the latency for best case may be reduced less than 50% if a length of the short TTI length is less than or equal to 0.25 ms. However, actual reduction may be a bit different if actual scheduling and other aspects are considered. To support this approach, HARQ-ACK timing and PUSCH timing need to be clarified which may be somewhat different from FDD case.

In TDD case, the average latency (RTT) may not be directly reduced to 8*TTI. For example, when UL-DL configuration 1 is used, RTT may be 16*TTI, which is 2 times of 8*TTI. To address this issue, one of the following options may be considered.

(1) Long RTT aligned with legacy TDD configuration: For example, UL-DL configuration 1 may be always used where the UL and DL portion are relatively same. In this case, the average RTT may be expanded as 16*TTI.

Figure 9:
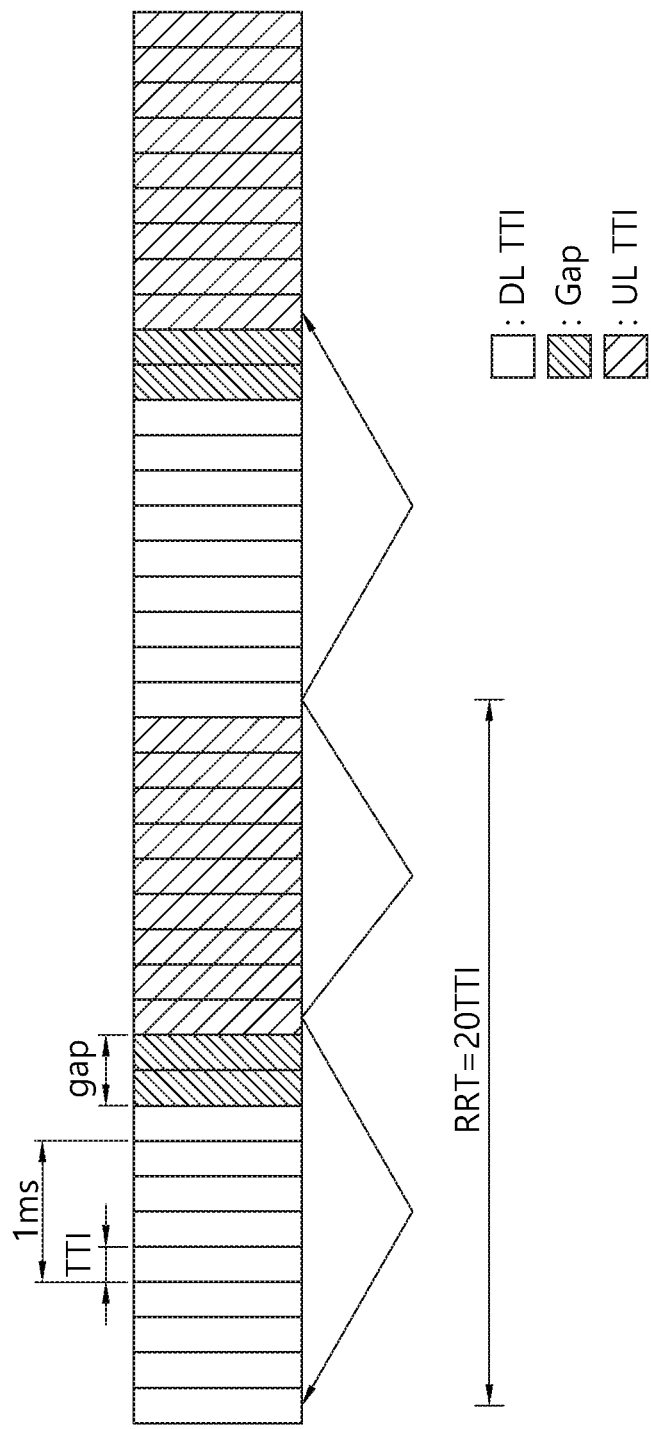
FIG. 9 shows an example of a TDD configuration for short TTI according to an embodiment of the present invention.

FIG. 9 shows an example of a TDD configuration for short TTI according to an embodiment of the present invention. This embodiment is based on UL-DL configuration 1. Referring to FIG. 9, it is assumed that 9 short DL TTIs are available and 2 short TTIs are used for gap and 9 short UL TTIs are available (which take turn), based on UL-DL configuration 1. In terms of timing, PUSCH may be transmitted at n+11 subframe, and PHICH may be transmitted at n+9 subframe. For this, 9 HARQ processes may be configured assumed for short TTI. However, this does not assume any MBMS transmission. This approach may not be able to reduce latency further, even though short TTI is used. Further, short TTI of 0.5 ms may be used in this approach, and in this case, only four DL TTIs and four UL TTIs may be configured considering the necessary of a gap, which means that only four HARQ processes is necessary.

Figure 10:
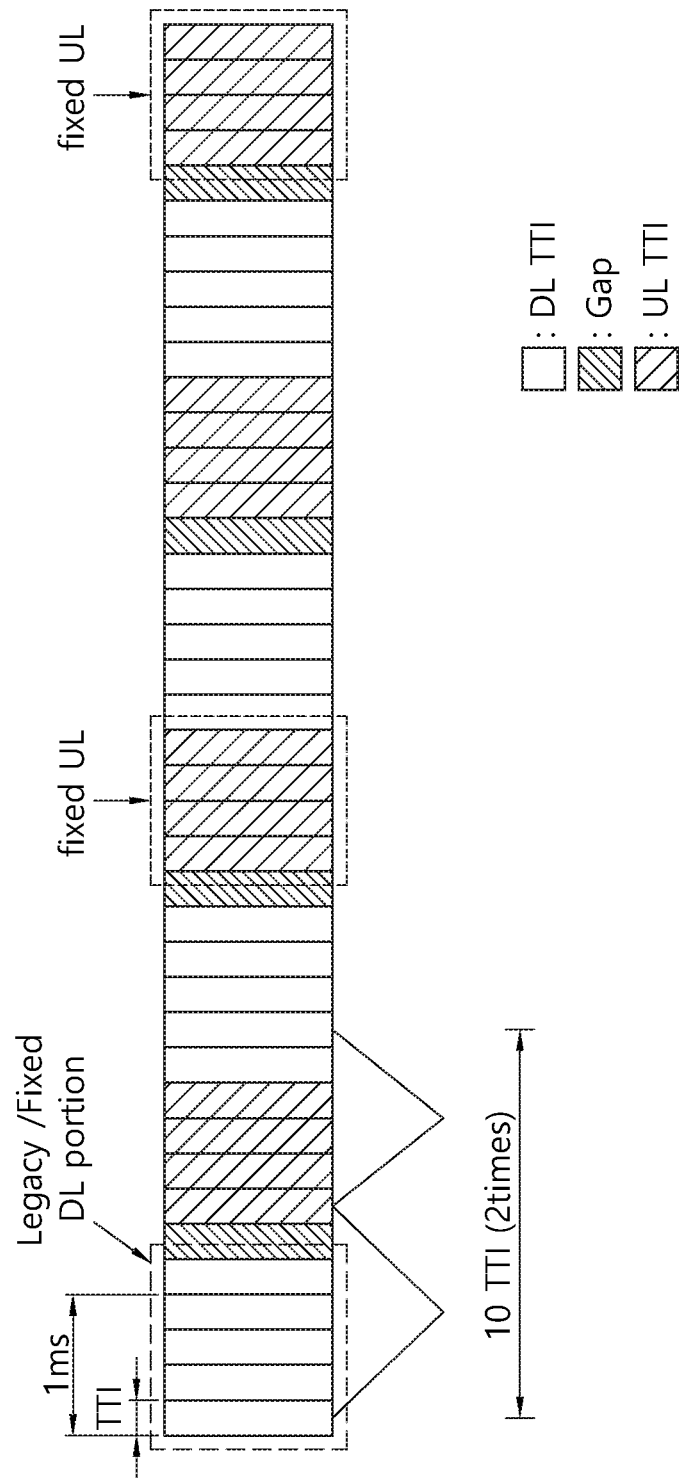
FIG. 10 shows another example of a TDD configuration for short TTI according to an embodiment of the present invention.

FIG. 10 shows another example of a TDD configuration for short TTI according to an embodiment of the present invention. This embodiment is based on UL-DL configuration 0. Referring to FIG. 10, 4 short TTIs are formed in a 1 ms subframe interval, and 5 short DL TTIs, 1 gap TTI, and 4 short UL TTIs are configured. Since the number of DL short TTIs is larger than the number of UL short TTIs, HARQ-ACK timing may be configured such that more than one short DL TTI is mapped to one short UL TTI, and one short UL TTI is mapped to more than one short DL TTIs. The principle of this design is to keep legacy DL portion of legacy UL-DL configuration as DL portion for short TTI transmission. Legacy DL portion may include normal subframe which is not MBSFN-capable subframe, not MBSFN subframe, non-MBMS region in MBSFN subframe, and DwPTS of special subframe. To maximize the flexibility, the legacy UL-DL configuration may be configured with UL-DL configuration 0 and DwPTS of 3 OFDM symbols. For a legacy UE, those normal subframe(s) or DwPTS may be scheduled and used for cell-specific reference signal (CRS) reception, measurement, etc. For a legacy UE, the available UL subframe may be UL subframes configured by UL-DL configuration if those are not used for short DL/UL TTI. Other than fixed DL or UL portion, depending on the scheduling, it may be used either for short DL/UL TTI or legacy UL subframe. Thus, in terms of measurement for an advanced UE, may assume that short TTIs aligned with legacy/fixed DL portion may be used only for measurement purpose as other may be used for legacy UL subframe(s).

In addition to UL-DL configurations described above, other short TTI UL-DL configurations may be considered. To allow a legacy UE to be associated with the carrier supporting the short TTI, fixed/legacy DL portion based on UL-DL configuration signaled by SIB may be used for DL portion even with short TTI frame structure. Furthermore, UL subframe(s) may be available either by frame structure or by scheduling. At least some resource for physical random access channel (PRACH) may be available. For example, the PRACH may be transmitted at least in fixed UL subframe(s) in the embodiments described above.

Figure 11:
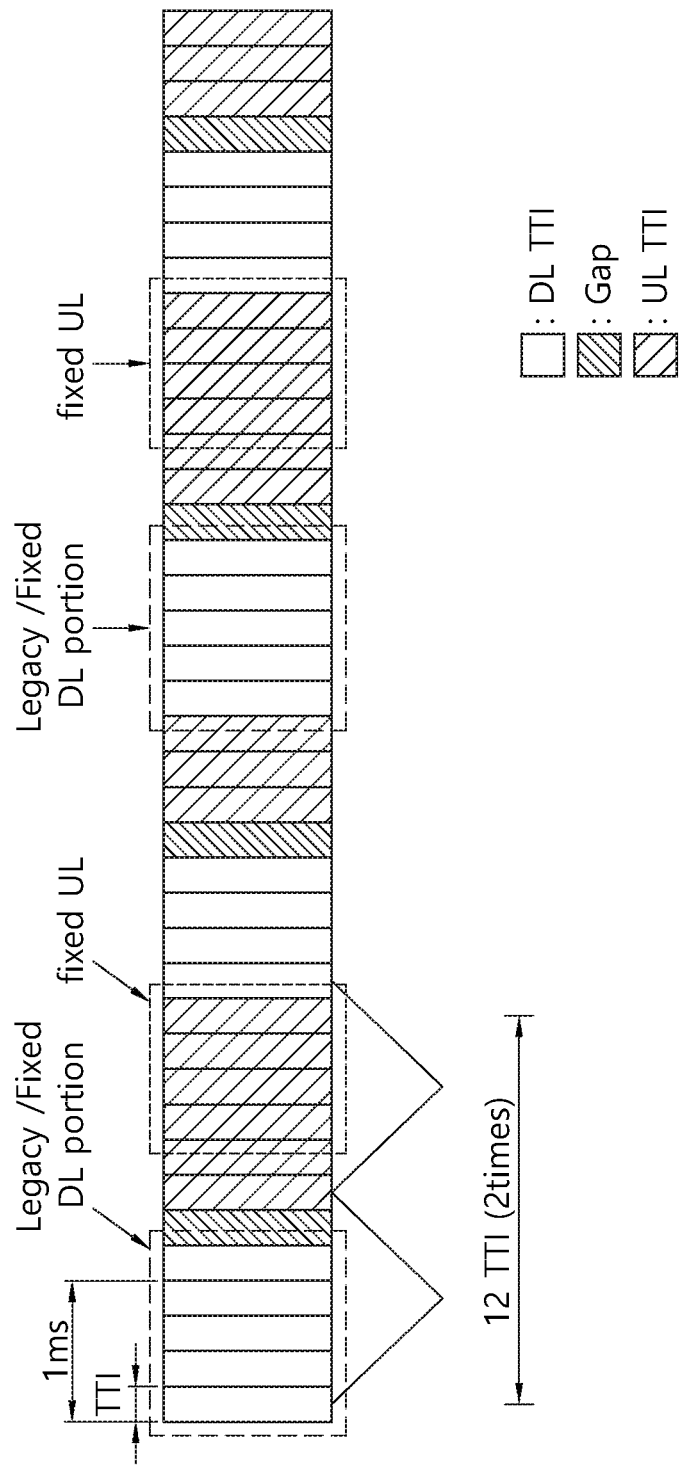
FIG. 11 shows another example of a TDD configuration for short TTI according to an embodiment of the present invention.

FIG. 11 shows another example of a TDD configuration for short TTI according to an embodiment of the present invention. This embodiment is based on UL-DL configuration 0. Referring to FIG. 11, 4 short TTIs are formed in a 1 ms subframe interval, and 5 short DL TTIs, 1 gap TTI, 6 short UL TTIs, and 4 short DL TTIs, 1 gap TTI, 3 short UL TTIs are configured.

Table 4 shows examples of short TTI configuration per legacy UL-DL configuration.

DDSU: When 3/4 symbol TTI is used
DSUU: When 3/4 symbol TTI is used
UUUU: When 3/4 symbol TTI is used
DDDD: When 3/4 symbol TTI is used
DDDDDSU: When 2 symbol TTI is used
DSUUUUU: When 2 symbol TTI is used
DDDSUUU: When 2 symbol TTI is used
DDSUUUU: When 2 symbol TTI is used
DDDDSUU: When 2 symbol TTI is used The options described above are merely examples, and some other cases may also be considered. For example, 1 symbol TTI may also be considered. In terms of configuration of self-contained structure in flexible subframe, the format may be signaled via SIB or higher layer signaling. Further, the special subframe may also contain self-contained subframe where the first TTI may carry legacy CRS to be backward compatible.

Figure 12:
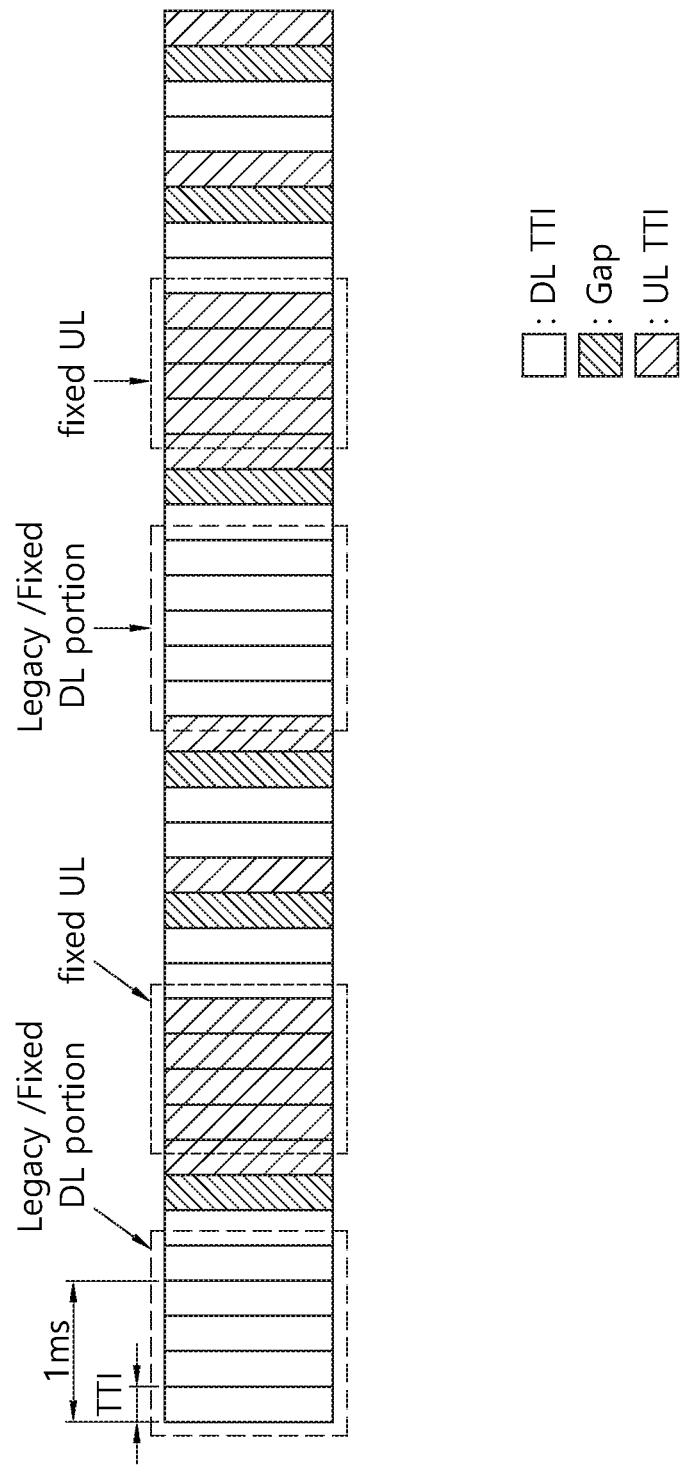
FIG. 12 shows another example of a TDD configuration for short TTI according to an embodiment of the present invention.

FIG. 12 shows another example of a TDD configuration for short TTI according to an embodiment of the present invention. This embodiment is based on UL-DL configuration 0. Referring to FIG. 12, 4 short TTIs are formed in a 1 ms subframe interval. Subframe 0 and 3 OFDM symbol from subframe 1 fixed DL portion are assigned as fixed DL portion, and subframe 2 is assigned as fixed UL portion.

Similar concept may be applied to other UL-DL configuration as well. Other than fixed DL and UL portion, flexible portions may be used for either short DL/UL TTI or gap.

To support legacy UEs and support backward compatibility, at least subframe 0 and 5 may be fixed DL portion, and

TABLE 4

| UL-DL Configuration | Option 1 (4 short TTIs per 1 ms) | Option 2 (3 short TTIs per 1 ms) | Option 3 (2 short TTIs per 1 ms) | Option 4 (7 short TTIs per 1 ms) |
|---|---|---|---|---|
| DSUUU (UL-DL configuration 0/3) | DDDDDSUUU UDDDDDSUU UU | DDDDSUUUU UDDDDSUUU | DDDU'UUDD U'U (U' = UpPTS) | DDDDDDDD DSUUUUUUU UUUDDDSUU UDDDSUUU |
| DSUUD (UL-DL configuration 1/4) | DDDDDSSUU UUUUUUUDD DD | DDDDSUUUU UUUDDD | DDDU'UUUU DD | DDDDDDDD DSUUUUUUU UUUDDDSUU UDDDDDDD |
| DSUDD (UL-DL configuration 2/5) | DDDDDSUUU UUUDSUUDD DD | DDDDSUUUU DSUDDD | DDD'UUUDD D'U | DDDDDDDD DSUUUUUUU UUUDDDDDD DDDDDDDD |

For each UL-DL configuration, UL, HARQ-ACK, PHICH timing may be defined such that mapping between short UL TTI and short DL TTI are rather uniformly distributed. And, the processing budget of at least 4 TTIs may allowed for a UE and at least two TTIs may allowed for network side.

Further, fixed DL portion and fixed UL portion may be allocated, and self-contained subframe may be assigned in non-fixed DL or UL portion. For example, assuming UL-DL configuration 0, fixed DL portion may be subframe 0 and 3 OFDM symbol from subframe 1 (repeated in 5 ms), and fixed UL portions may be subframe 2. The overall latency may be dependent on the actual special subframe configurations to allow more DL/UL switching points in each subframe. As the fixed portion may be at least 30% in total (which may be further increased if paging is also considered).

In other subframe, self-contained subframe structure may be used. In terms of self-contained subframe structure, the followings may be considered.

at least one UL subframe may be fixed UL portion. For configuring fixed DL/UL portion, reference UL-DL configuration or fixed UL-DL configuration may be configured via SIB or by higher layer signaling. For example, if UL-DL configuration 5 is configured as fixed UL-DL configuration, subframe 2 may be fixed UL subframe. For fixed DL/UL portion, different reference/target UL-DL configuration may be given by SIB or by higher layer signaling. Also, to allow that fixed UL portion can be any UL subframe, bitmap configuration of fixed DL/UL portion may be considered.

In the fixed DL/UL portion, multiple short TTIs may be placed. Only short DL TTIs may be placed in fixed DL portion, and only short UL TTIs may be placed in fixed UL portion. Further, in terms of HARQ-ACK timing and/or PUSCH timing, the load may be distributed evenly over short UL TTIs, while minimizing the RTT latency.

(2) Multiple carriers with shift: Similar to MBSFN handling, multiple carriers may be used for handling unavailable DL and/or UL TTI(s).

Figure 13:
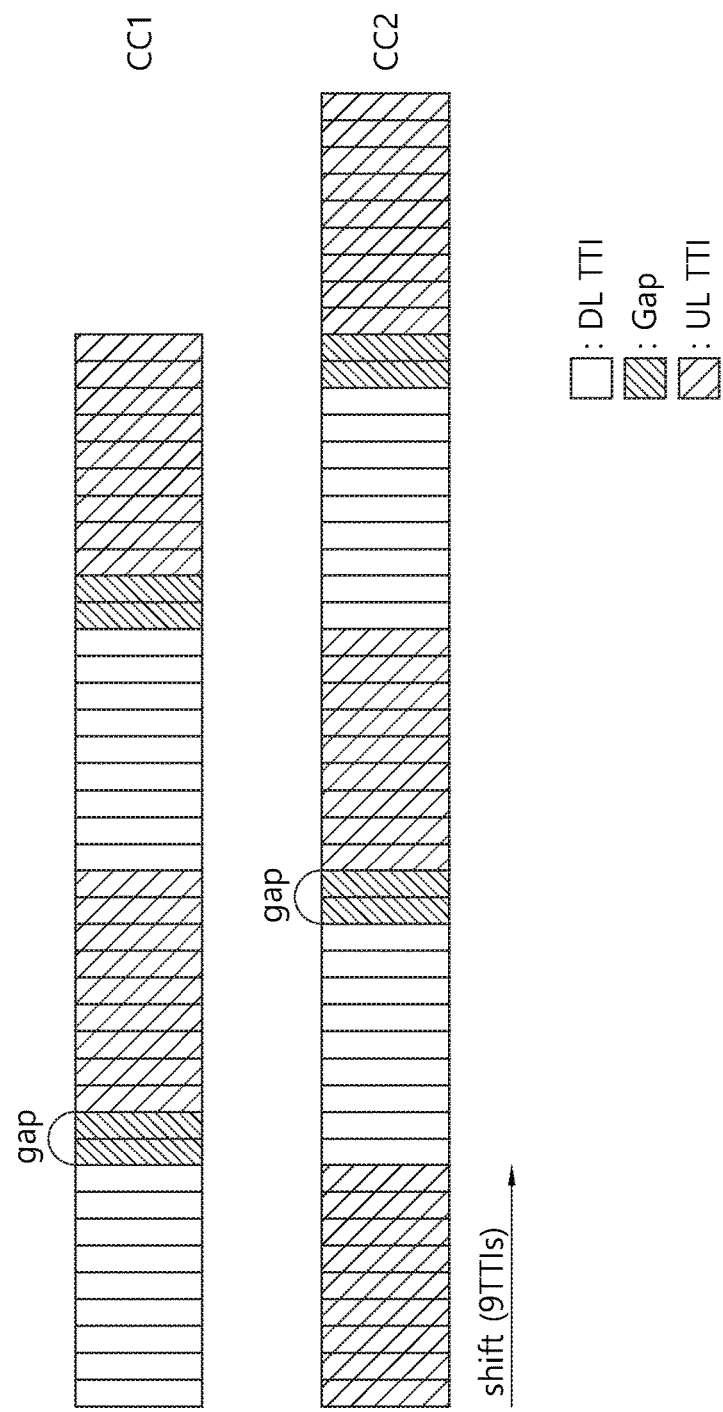
FIG. 13 shows an example of multiple carries for short TTI in TDD case according to an embodiment of the present invention.

FIG. 13 shows an example of multiple carries for short TTI in TDD case according to an embodiment of the present invention. This embodiment is based on UL-DL configuration 1. Referring to FIG. 13, a UE is configured with CC1 and CC2, where CC2 is shifted of 9 TTIs (2.25 ms). Thus, CC1 and CC2 may not aligned by subframe index nor subframe boundary. PUSCH may be transmitted at n+4 subframe, in either CC depending on the availability of UL. PHICH may be transmitted at n+6 subframe, where maximum 8 HARQ processes may be mapped per CC. Or, a new HARQ-ACK timing may be considered to maximize the use of all short TTIs.

To support this approach, different timing may be used per frequency. For example, frequency 1 and frequency 2 may be used in a pair to support short TTI operation, in terms of subframe index/boundary. In this case, one carrier may be shifted with a certain value such that the number of available short DL/UL TTI over duration can be maximized. In terms of carrier aggregation, a UE may be configured with a virtual one carrier which is similar to a FDD carrier. For timing advance, a UE may apply timing advance configured per each carrier depending on which carrier is used for UL transmission. For DL, time/frequency may synchronized based on synchronization/CRS/tracking RS transmitted per each carrier.

Figure 14:
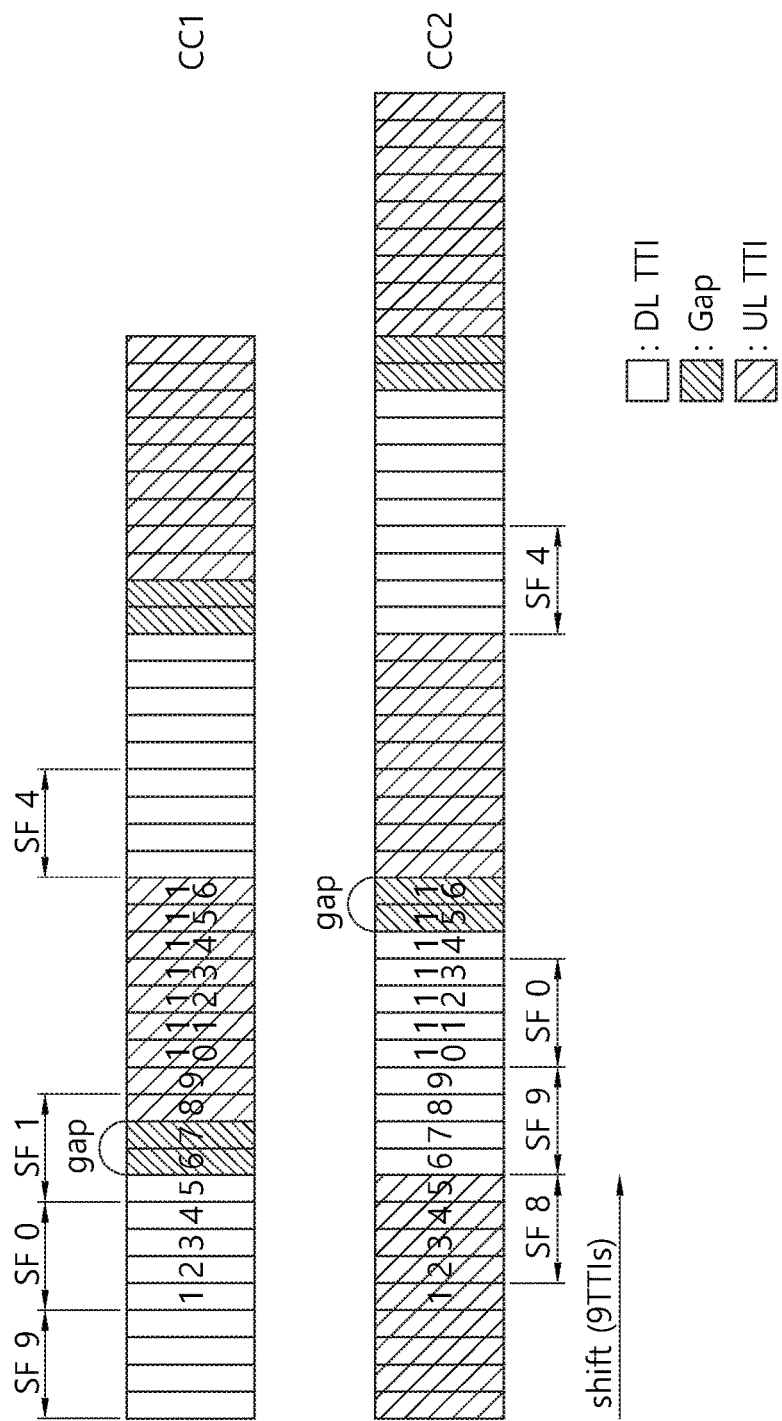
FIG. 14 shows an example of subframe/TTI index of multiple carries for short TTI in TDD case according to an embodiment of the present invention.

FIG. 14 shows an example of subframe/TTI index of multiple carries for short TTI in TDD case according to an embodiment of the present invention. FIG. 14 corresponds to a frame structure shown in FIG. 13, and subframe/TTI index are assigned. Referring to FIG. 14, the TTI index may be fixed based on the anchor carrier (e.g. CC1) for short TTI, whereas the subframe index may follow based on legacy subframe index per each carrier.

The TTI potentially used for a gap may not be scheduled with DL transmission. If there is some ACK-NACK timing is mapped to the gap, a UE may assume that ACK-NACK may be dropped/omitted in gap TTIs. In terms of scheduling of short TTI, short TTI index may be used in terms of scrambling, etc. If a UE is scheduled in a legacy TTI, subframe index of a legacy frame structure may be used. Legacy signals such as primary synchronization signal (PSS)/secondary synchronization signal (SSS) and CRS may be transmitted per legacy protocol, unless the short TTI is used in non-backward compatible carrier.

(3) Omit HARQ-ACK: If there is no available UL or DL portion for HARQ-ACK transmission, ACK/NACK transmission may be skipped. However, this approach does not resolve the issue with data transmission.

(4) Assuming full-duplex eNB: If the eNB can support full duplex, one carrier may be divided into two parts. The first half may be used with legacy TDD configuration for legacy UEs as well as for advanced UEs. The second half may be used only for advanced UEs.

Figure 15:
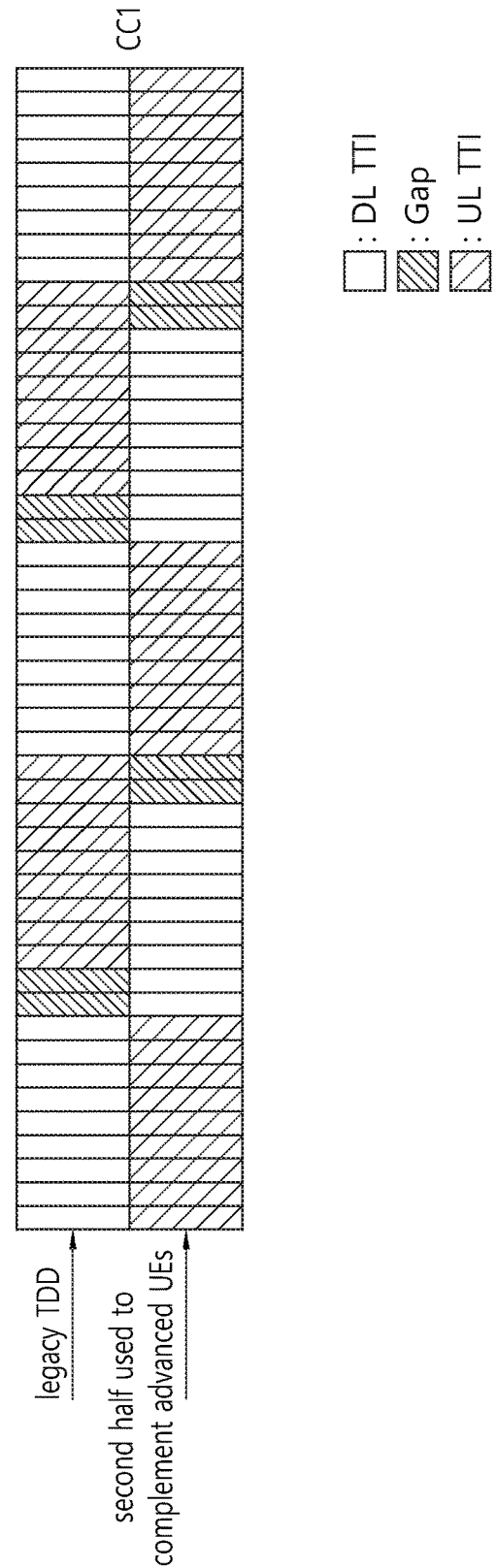
FIG. 15 shows an example of a full-duplex carrier for short TTI in TDD case according to an embodiment of the present invention.

FIG. 15 shows an example of a full-duplex carrier for short TTI in TDD case according to an embodiment of the present invention. Referring to FIG. 15, a carrier is divided into two parts, one of which is used for legacy TDD configuration, and the other is used for complement advanced UEs. Similar to multiple carriers with shift, a UE may move around each portion to use the available DL and/or UL TTIs.

(5) Assuming multi-carrier capable eNBs and full duplex capable UEs: One TDD carrier may be divided into two or three TDD carriers. One carrier may have different UL-DL configuration which can be used to complement DL and/or UL portions corresponding to legacy TDD carrier.

Figure 16:
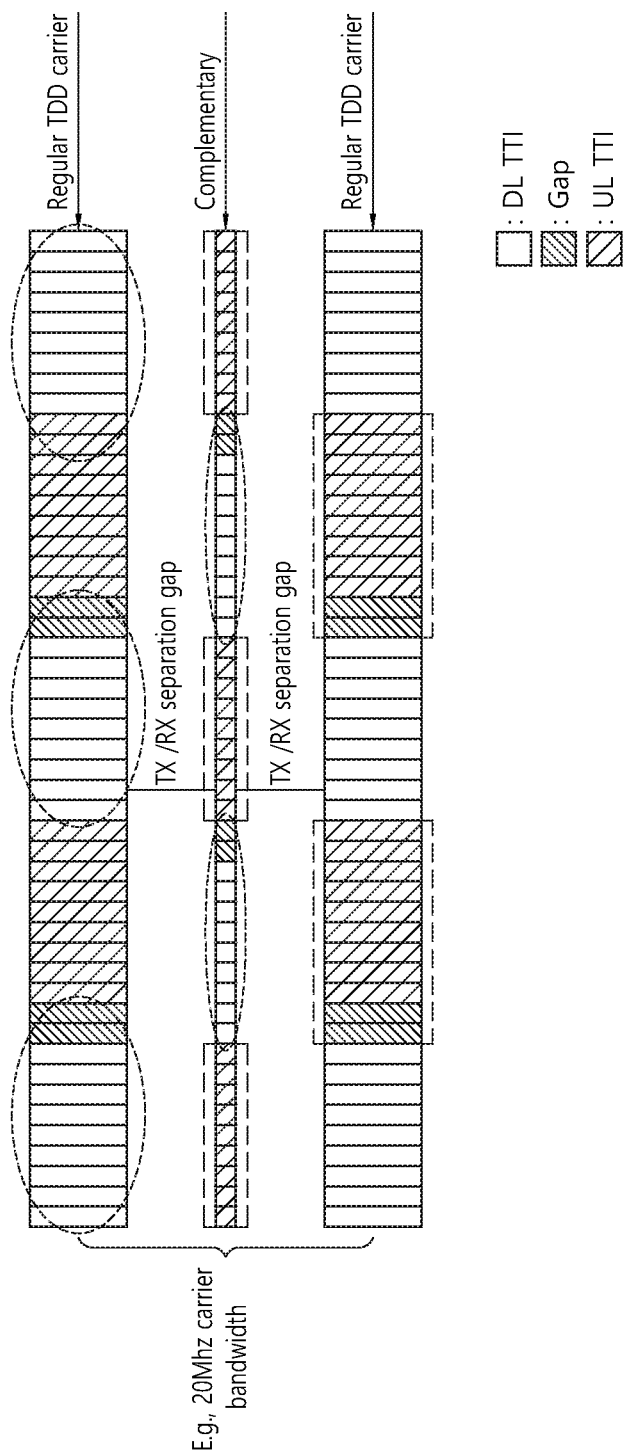
FIG. 16 shows an example of division of a carrier for short TTI in TDD case according to an embodiment of the present invention.

FIG. 16 shows an example of division of a carrier for short TTI in TDD case according to an embodiment of the present invention. Referring to FIG. 16, 20 MHz carrier may be separated into two 5 MHz legacy TDD carriers and one small complementary carrier in the middle. The complementary carrier may have different UL-DL configuration from the legacy TDD carrier. To support this approach, the network may need to support three TDD carriers at the same time where legacy UEs may be associated with legacy UL-DL configuration. An advanced UE may be able to support full duplex (i.e. receive and transmit simultaneously in different frequencies). For example, UL may occur in complementary carrier and legacy TDD carrier (depending on the UL-DL configuration) and DL may occur in legacy TDD carrier and commentary carrier.

In summary, in the description above, a few approaches have been proposed according to embodiments of the present invention, to minimize unavailable short DL/UL TTIs for reducing the latency in a backward compatible carrier where some portion of subframe(s) are not available for DL/UL transmission due to MBMS and/or TDD operation. Further, a few frame structure with keeping the legacy UL-DL configuration while reducing the overall round-trip time have been proposed. In general, at least one DL portion and one UL portion may be allowed in every TTI opportunity via FDM and/or multi-carrier operation with shift. When multi-carrier is used, short TTI indexing is as if multiple carriers aggregated for the operation is virtually one carrier for short TTI operation. If there are more than one short DL/UL TTIs available at a given moment, the cell with the smallest cell index may be selected. It is further assumed that a UE is capable of supporting multiple carriers at a time with subframe index shifted to support the operation.

2. Unlicensed Spectrum Handling

If unlicensed spectrum is considered, fixed DL portion and/or fixed UL portion may not exist. Thus, short TTIs may be placed in any subframe. In terms of defining short DL/UL TTI in unlicensed spectrum, one of the following options may be considered.

(1) Unless scheduled for UL transmission, all portions may be assumed to be operating with short DL TTI. One short TTI or one or a few OFDM symbols before UL transmission (scheduled semi-statically or dynamically) may be used for gap including timing advance TA and clear channel assessment (CCA).

(2) Based on option (1) described above, subframes configured with discovery reference signal (DRS) transmission (including DRS measurement timing configuration (DMTC) duration) may not be used for short DL/UL TTI. If a UE has to read DRS, the UE may assume that the DMTC is not used for short DL/UL TTI. Otherwise, a UE may assume short DL/UL TTI within DMTC which are determined by the scheduling. Even in this case, a UE may not be allowed to transmit semi-statically configured UL transmission such as channel state information (CSI) feedback within the configured DMTC.

(3) Based on option (1) described above, subframe 0 and 5 may not be used for short UL TTI. Subframe 0 and 5 may be used for short DL TTI. Even in subframe 0 or 5, a UE may assume short UL TTI available if UL transmission is scheduled via sPDSCH transmission (sPUCCH transmission) or sPUSCH UL grant.

(4) Combination of option (2) and option (3) described above may be considered.

(5) Fixed UL-DL configuration for short TTI may be considered. For example, a set of fixed short TTI UL-DL configuration may be used for unlicensed spectrum with short TTI.

(6) Based on a higher layer signaling, a set of subframes may not be used for short UL TTIs (and/or short DL TTIs). The signaling may include some subframes reserved for MBMS transmission.

If short TTI UL-DL configuration is used, for example, DDDSUUU (may be repeated) may be used. If a length of the short TTI is two OFDM symbols, DDDSUUU fits in 1 ms interval. If a length of the short TTI is three/four OFDM symbols, DDDDSUUU may be considered, where the first D may include one or two OFDM symbol used for PDCCH transmission, and S may also include one or two OFDM symbol used for PDCCH transmission. If a length of the short TTI is seven OFDM symbols, DS may be considered where S includes gap and UpPTS (size of a few OFDM symbols (e.g. 1, 2, 3/4)).

If dynamic short TTI UL-DL configuration is used, PUCCH transmission may not occur at the given time due to no available short UL TTI or channel busy. In this case, transmission of lost ACK/NACK may be performed in the next PUCCH transmission opportunity, with piggybacking all previously lost ACK/NACK transmissions. To convey how many ACK/NAKC bits are transmitted in the given transmission, the number of carried ACK/NACK bits may also be piggybacked. Alternatively, transmission of lost ACK/NACK may be performed in the next available short UL TTI. If another UL such as PUCCH or PUSCH is scheduled in the next available short UL TTI, lost ACK/NACK may be piggybacked with PUCCH or PUSCH.

Alternatively, dynamic signaling of self-contained TTI configurations (e.g. DDDSUUU, DDSUUUU, DDDDSUU, etc.) may be configured via common DCI in every transmission burst. By detecting a common DCI, a UE may assume the configuration of short TTIs for the given duration T. T value may be prefixed, higher layer configured or dynamically indicated by the common DCI. Within T, a UE may not need to perform CCA assuming eNB transmits reservation signals to protect the channel. Alternatively, CCA may also occur, and the common signal may define the starting of short DL TTIs and potentially short UL TTIs for the transmission of PUCCH, etc.

3. Dynamic TDD in Backward Compatible Manner

To support legacy UEs and to allow flexible operation of short TTI in the meantime, legacy UL-DL configuration 0 may be configured from legacy UE perspective.

Figure 17:
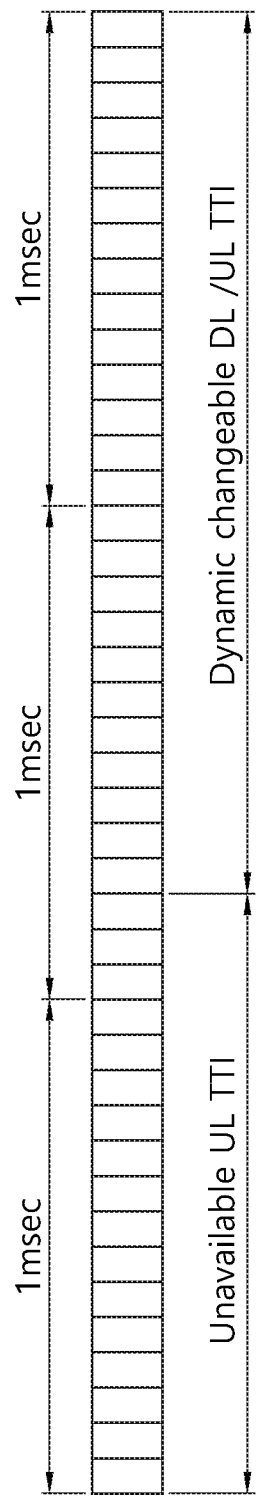
FIG. 17 shows an example of a frame structure for dynamic short TTI in TDD case according to an embodiment of the present invention.

FIG. 17 shows an example of a frame structure for dynamic short TTI in TDD case according to an embodiment of the present invention. Referring to FIG. 17, a short TTI of 1 OFDM symbol is used. One short TTI may be as small as one symbol OFDM symbol. It does not matter whether the same TTI length is used for DL and UL or different TTI size is used. If different TTI size is used, whenever dynamic transmission occurs, the TTI size may follow the configured TTI size for the corresponding channel or UL/DL. For this, the network may configure legacy UL-DL configuration 0 in which the least number of fixed DL subframes are assigned. Also, for the special subframe configuration, the shortest DwPTS may be configured such that the most resources can be used flexibly to change between DL and UL.

Timing of each channel may be as follows.

(1) sPDCCH: sPDCCH may be transmitted in one or up to m TTIs. If one or more TTIs among m TTIs are scheduled for UL transmission or needed for switching from DL to UL or from UL to DL (switching latency from UL to DL may not be necessary assuming fixed offset for timing advance such as 20 us which may be used for switching latency), a UE may be allowed not to listen on those TTIs. Alternatively, the size of TTI for sPDCCH may be fixed as one symbol.

(2) sPDCCH to sPDSCH: In terms of UE buffering, maximum number of TTIs may be buffered at one time. For example, n TTIs may be buffered at the same time. PDSCH may be transmitted from one TTI to n TTI within the buffered n TTIs. In terms of buffering, it may move one TTI per time or it may move n TTIs per time. To allow flexibility of various TTI sizes for PDSCH, n TTIs may be buffered at one time and may be switched to next n' TIs in every n TTIs. If the size of sPDCCH is fixed to one TTI, the buffer may swipe to the next TTI in every TTI. In this case, the buffering capability may be viewed as buffering multiple TTIs.

(3) sPDSCH to sPUCCH: In terms of determining sPUCCH transmission location, the sPUCCH may always be mapped to n+k subframe, where the n is the last TTI of sPDSCH transmission. Since it may always not be possible due to switching from UL/DL or some scheduling or overlap with some other thing (e.g. paging occasion), the set of sPUCCH transmittable TTIs may be prefixed, which may be configured by the higher layer. For example, sPUCCH may be configured as every K TTIs where all DL TTIs mapped between [I*K−k, (I−1)*K−k] DL TTIs to I*K short UL TTI for sPUCCH transmission. In other words, maximum K ACK/NACK may be multiplexed within one UL TTI. In terms of transmitting potentially K*M ACK/NACK bits (M is the maximum ACK/NACK bits corresponding to one DL TTI), the maximum resource may be assumed in terms of sPUCCH transmission.

(4) sPDCCH to sPUSCH: sPUSCH may be transmitted in the first TTI at n+k subframe. The overall TTI sizes for sPUSCH transmission may be dynamically or semi-statically configured by higher layer.

(5) If some TTIs are not available for DL or UL due to the alignment with legacy UL-DL configuration where transition to DL or UL is scheduled by the network, a UE may assume misconfiguration and does not switch its DL or UL. Or, different timing relationship in those TTIs not available for dynamic switching between DL and UL may be used. For example, sPUCCH timing of all DL TTIs aligned with legacy UL-DL configuration may be determined as the first dynamic DL/UL TTI. After the first dynamic DL/UL TTI, the timing may applied per the description above. Those TTIs (DL TTIs) to be aligned with legacy UL-DL configuration may be assumed as invalid TTIs from the UL perspective and PUCCH timing on those invalid UL TTIs may be mapped to the first available UL TTI. Here, valid UL TTI refers the dynamic changeable DL/UL TTI which may be mapped to any UL portion of the legacy UL-DL configuration.

Figure 18:
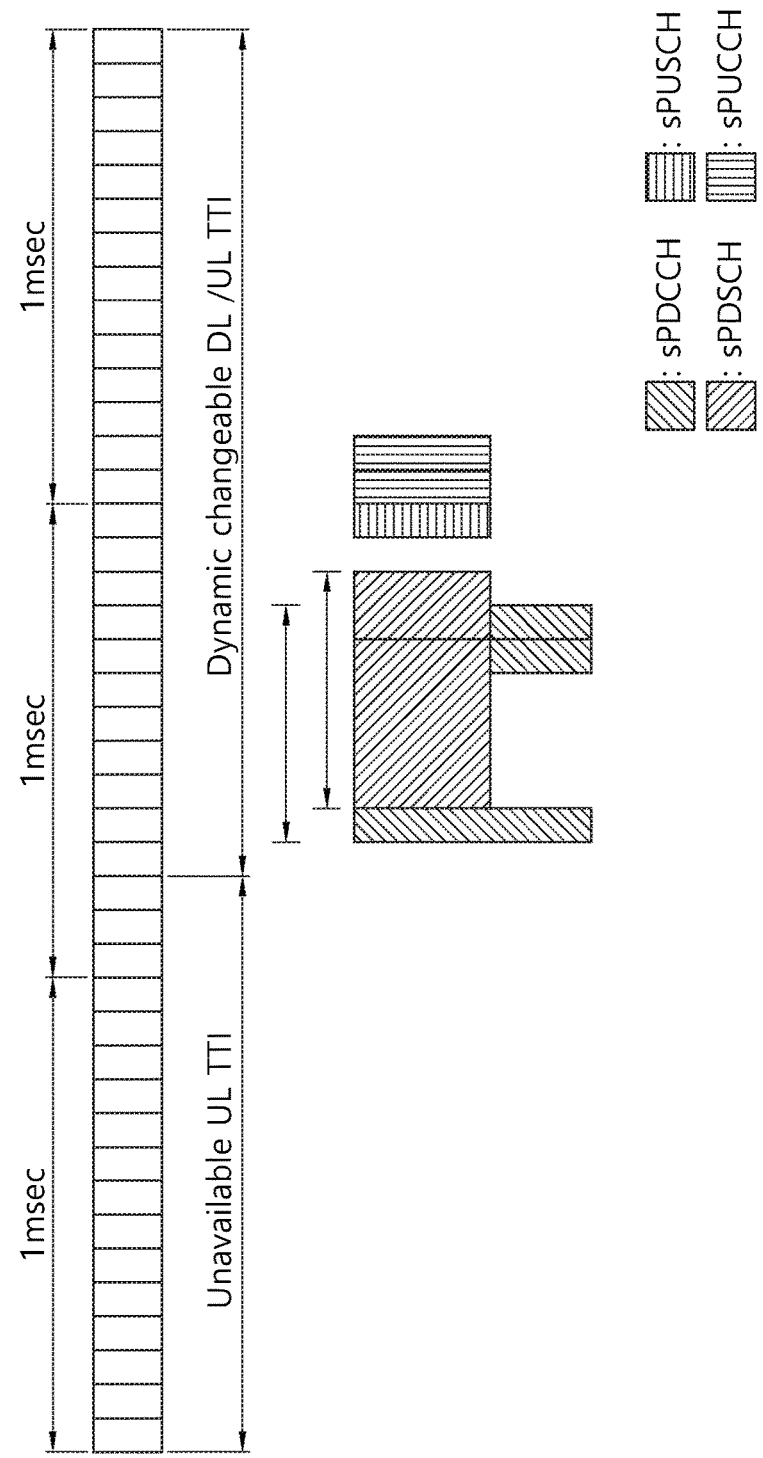
FIG. 18 shows another example of a frame structure for dynamic short TTI in TDD case according to an embodiment of the present invention.

FIG. 18 shows another example of a frame structure for dynamic short TTI in TDD case according to an embodiment of the present invention. FIG. 18 shows unavailable UL TTIs and dynamically changeable UL/DL TTIs with some channels.

Figure 19:
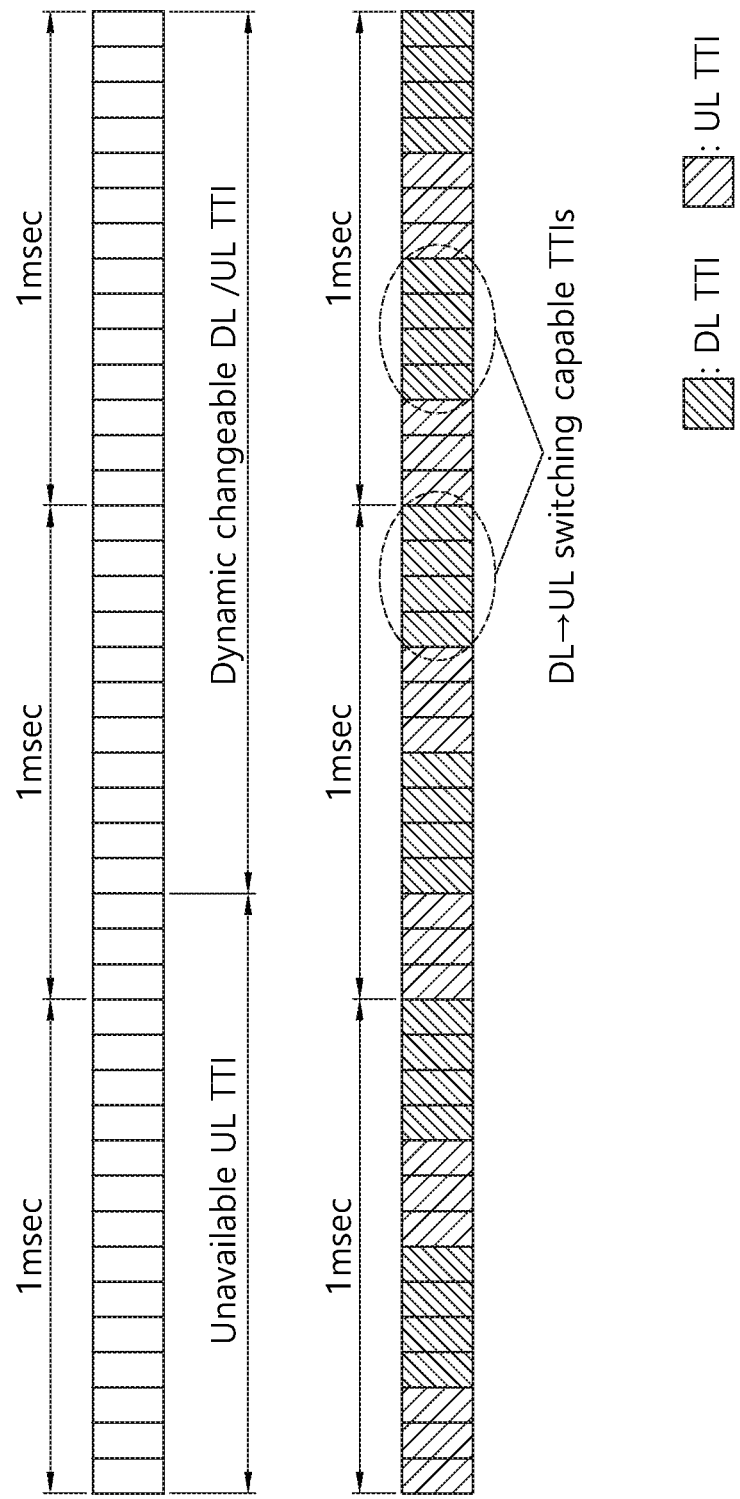
FIG. 19 shows another example of a frame structure for dynamic short TTI in TDD case according to an embodiment of the present invention.

FIG. 19 shows another example of a frame structure for dynamic short TTI in TDD case according to an embodiment of the present invention. In this type of operation, a short TTI of 3 or 4 OFDM symbols may be considered. Instead of changing UL or DL TTI per OFDM symbol, DL/UL may change in every 3 or 4 OFDM symbols. For example, 4 DL OFDM symbol may be assumed and one last OFDM symbol may be used for DL to UL switching in case of switching to UL TTI occurs. In this case, for example, there may one DL and UL TTI in the one slot.

In this case, sPDCCH may always be transmitted in TTI size of 3 OFDM symbols regardless of actual TTI size. If the sPDCCH overlaps with legacy PDCCH, the sPDCCH may be transmitted in the legacy PDCCH region (assuming three OFDM symbol or smaller). The sPDSCH and/or sPUSCH may be transmitted in TTI size of 3 or 4 OFDM symbols depending on whether the gap is necessary or sounding reference signal (SRS) is transmitted (i.e. the last OFDM symbol may be used or not). In other words, TTI size of 4 OFDM symbols can be used for switching from DL to UL or transmit SRS.

For sPUCCH timing, DL TTI i with 3 OFDM symbols may be mapped to UL TTI i+4, and DL TTI i+1 with 4 OFDM symbols may be mapped to UL TTI i+5. In other words, sPUCCH may always be mapped to three OFDM symbol TTIs and two TTIs may be mapped to one sPUCCH possible UL TTI. This is to fix or use the gap only in 4 OFDM symbol TTIs, and the transition between DL and UL can occur only in those 4 symbols TTIs. Similar things may be done with 2/3 OFDM symbol combinations. For example, one slot may consist of 2 symbol TTI/3 symbol TTI/2 symbol TTI (and repetition) or 3 symbol TTI/2 symbol TTI/3 symbol TTI/2 symbol TTI/2 symbol TTI/2 symbol TTI, where the transition may occur only in three OFDM symbols TTIs. In terms of sPUCCH timing, sPUCCH possible subframes may be determined as next TTIs next to 3 symbol TTI, where DL to UL switching is allowed. In other words, some TTIs in a 1 ms window or some window, subset of TTIs may be available for DL to UL switching. In the case of 2/3 OFDM symbols, sPDSCH and/or sPUSCH may be mapped to 2 or 3 OFDM symbols.

If sPUSCH timing is after DL TTI with 3 OFDM symbols, the timing may be pushed to the next TTI or sPUSCH may be dropped. In other words, sPUSCH may be transmitted in one TTI where DL to UL switching is not necessary or pushed to the next subframe where switching can occur.

The number of DL→UL switching capable TTIs may vary or may be flexibly configured by the higher layer. The timing of sPUCCH may be determined that only UL subframes next to switching capable TTI may be used for sPUCCH. And, depending on the processing time, multiple potential DL TTIs may be mapped to the one sPUCCH capable TTI. For sPUSCH, it may be allowed in TTIs not next to switching capable TTIs only if no switching is necessary (since the UL transmission continues) or in TTIs next to switching capable TTIs.

Further, the similar concept may be applied for 1 OFDM symbol TTI case as well. Some TTI with 2 OFDM symbols with potentially one symbol used for the gap may be higher layer configured. Further, the similar concept may be applied for unlicensed spectrum where any restriction on fixed DL/UL portion is not necessary. However, one or a few DL/UL portions may be fixed support legacy UEs. Further, the similar concept may be applied to new carrier where legacy CRS is not transmitted or any legacy UEs may not be associated with. Also, TTI size and/or fixed DL/UL portion may be different from 1 ms (which are used for mainly alignment with legacy frame structure).

4. Every Subframe with UL/DL Switching

To maximize opportunities of UL and DL transmission in TDD, it may be considered to increase the switching point of UL/DL switching opportunities more than supported in legacy frame structure compared to legacy UL-DL configuration. To maintain backward compatibility, some constraints including the following list may be considered in this approach.

Legacy CRS OFDM symbols should be transmitted in normal DL and the first two OFDM symbols in MBSFN subframe Legacy control region should be maintained in normal DL and MBSFN subframe PSS/SSS should be transmitted SIB1 transmission should be guaranteed Supporting paging transmissions should be considered PRACH resource is reserved For example, every subframe, including subframe 0, 2, and 5, may be allowed for switching point. In normal DL subframe, due to legacy CRS, the candidate position of short UL TTI may be restricted. Accordingly, the possible candidate locations may be as follows.

OFDM symbol 2 and 3 in the first slot: this may not be usable for special subframe due to PSS transmission OFDM symbol 5 and 6 in the first slot OFDM symbol 2 and 3 in the second slot: this may restrict many CSI-RS configuration Overall, it is desirable to place UL portion over OFDM symbol 5 and 6 in the first slot if possible. However, this OFDM symbols may with legacy demodulation reference signal (DM-RS) transmissions. Thus, if short TTI length 7 is used or legacy TTI is used, different location may be used for DM-RS transmission. In other words, if UL portion is configured to advanced UEs, it UL OFDM symbols may be punctured from legacy UE perspective (and thus may degrade the performance of legacy UEs).

However, subframe 0 may carry PBCH in OFDM symbols 0-4 in the second slot, and may also carry SSS in OFDM symbol 6. In this sense, UL portion configured in subframe 0 may be only configurable in OFDM symbols 2 and 3 in the first slot, which restricts less than one OFDM symbol GP and one OFDM symbol UpPTS transmission with PUCCH/PUSCH. Furthermore, it may not be feasible to configure any UL portion in subframe 0 or 5 if there is scheduling to legacy UEs. In this sense, whether to allow UL portion in subframe 0 and/or 5 can be higher layer configured or dynamically indicated via common signaling.

Alternatively, this may be enabled only when there is no DL traffic to legacy UE in the same subframe. Whether the normal subframe contains UL portion or not may be indicated by cell-common signaling such as common DCI or some cell common signaling/RS. Alternatively, an advanced UE supporting short TTI may be configured with short middle UL portion in normal subframe(s). The short middle UL portion may be enabled by dynamic scheduling only. In other words, such UL portions, due to the potential usage for DL depending on the legacy UEs, may not be assumed for any periodic UL transmissions such as CSI feedback, SRS, semi-persistent scheduling (SPS) PUSCH, etc.

The special subframe may be adjusted similar to normal subframe.

In MBSFN and/or UL subframe, the switching points may be adjusted depending on the required number of short DL/UL TTIs (e.g. one switching point to multiple switching points).

GP between DL and UL may be more than one OFDM symbol. The gap value may also be configured by the network or indicated by the network. If there is no indication, the same gap value from special subframe configuration may be used. If the gap value is larger than 1 OFDM symbol, having more than one switching point may be very inefficient from the spectral efficiency perspective. Thus, it is desirable to minimize switching point to one per every subframe. If two OFDM symbols are needed, OFDM symbol 1, 2, 3 in each slot may be considered in normal subframes. In this case, advanced UEs may not read antenna port 3, 4 for CRS for any feedback, data demodulation, etc. Also, it may be assumed that legacy PDCCH (if it contains any control information to advanced UEs) is restricted to one OFDM symbol if the first slot is used. Two switching points may be considered if spectral efficiency degradation is acceptable. If three OFDM symbol gaps are necessary, it is not desirable to configure any switching point in normal subframe. If necessary, OFDM symbol 2, 3, 4, 5 in the second slot or first slot may be utilized by assuming that a UE may not be able to read CRS properly.

Figure 20:
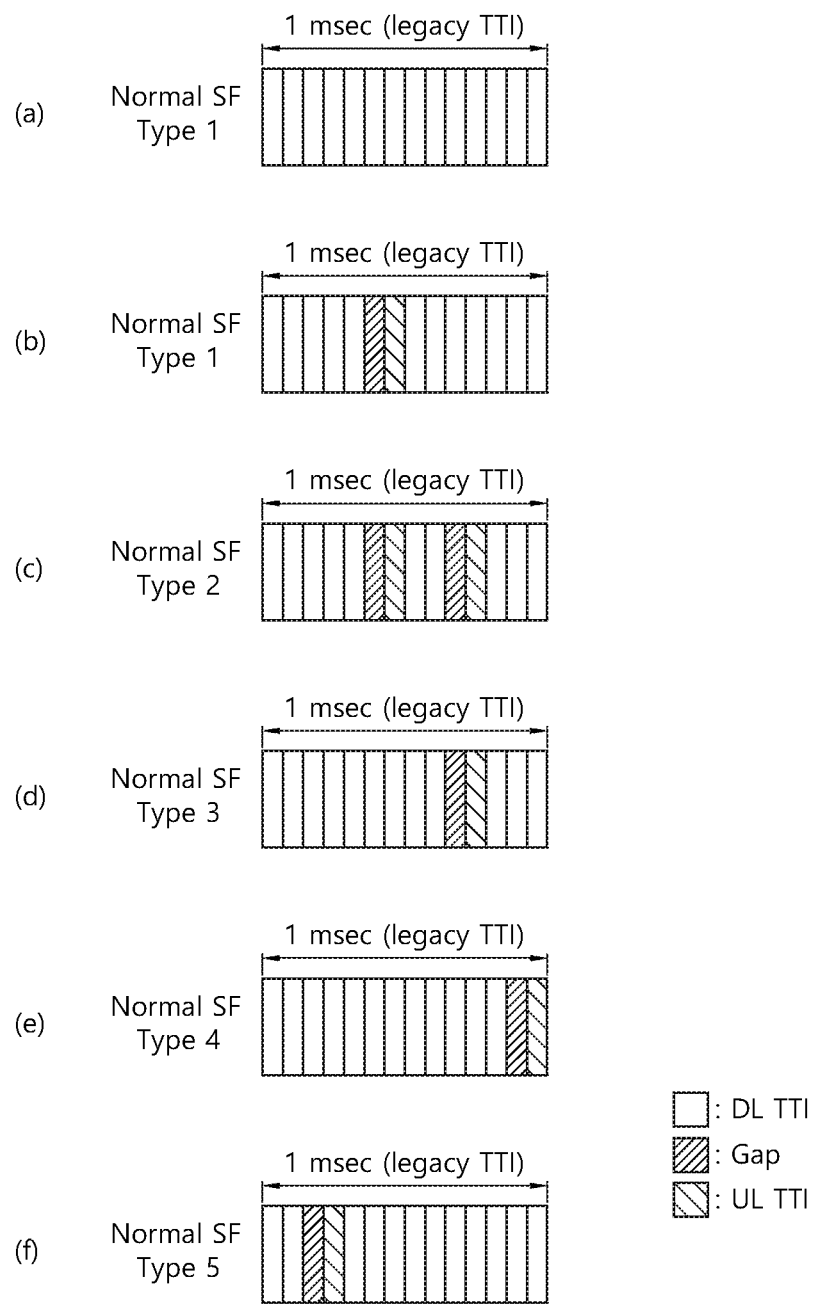
FIG. 20 shows examples of different subframe types of a normal subframe using short TTI for different UL/DL switching patterns according to an embodiment of the present invention.

FIG. 20 shows examples of different subframe types of a normal subframe using short TTI for different UL/DL switching patterns according to an embodiment of the present invention. Referring to FIG. 20, various UL/DL switching patterns may be used for normal subframe using short TTI for different.

Figure 21:
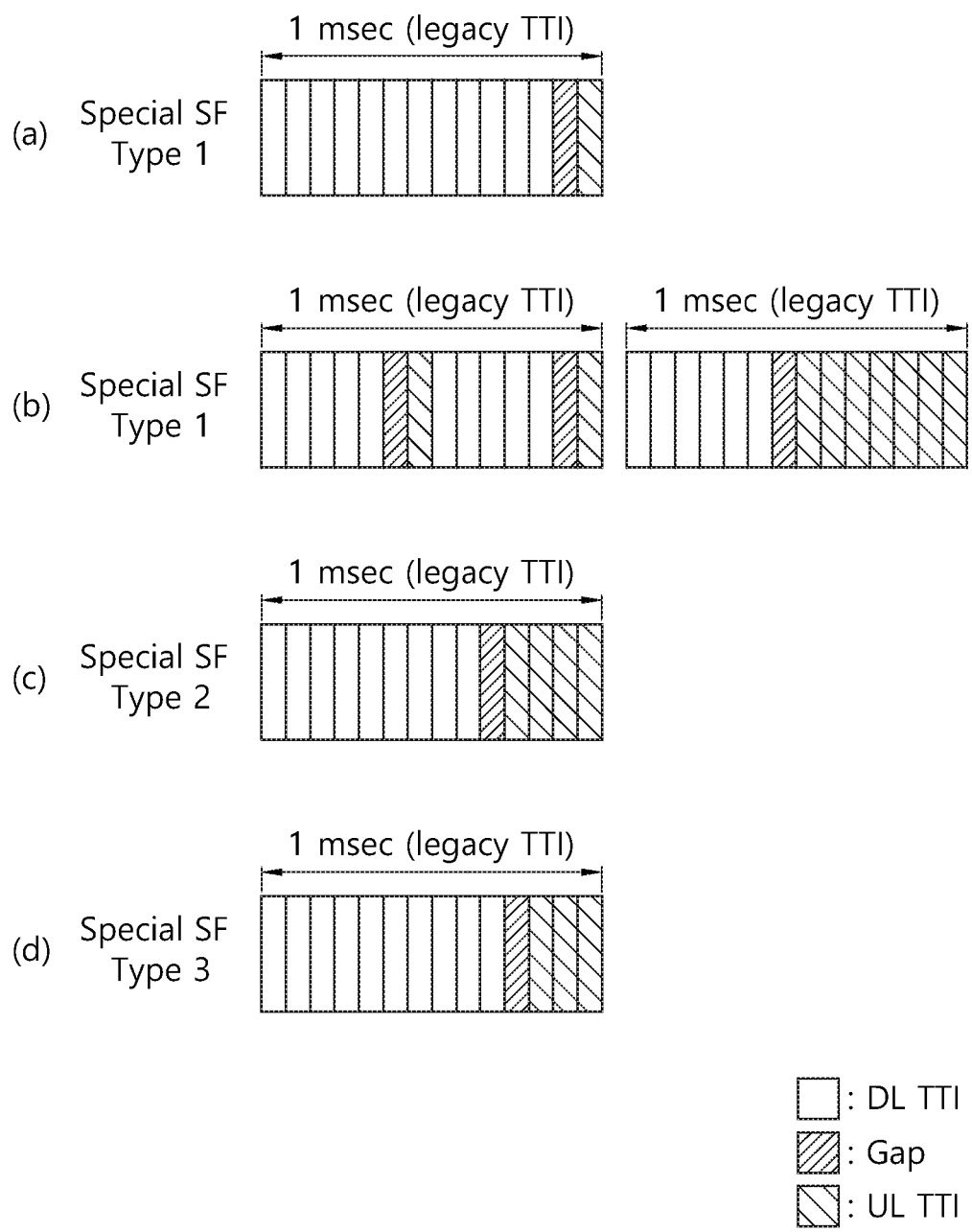
FIG. 21 shows examples of different subframe types of a special subframe using short TTI for different UL/DL switching patterns according to an embodiment of the present invention.

FIG. 21 shows examples of different subframe types of a special subframe using short TTI for different UL/DL switching patterns according to an embodiment of the present invention. Referring to FIG. 21, various UL/DL switching patterns may be used for special subframe using short TTI for different. Further, more configuration with special subframe configuration may be possible. The gap size per each special subframe configuration may be reduced to 1 or a few OFDM symbols and the remaining OFDM symbols in the original gap portion may be used for UL portion.

Figure 22:
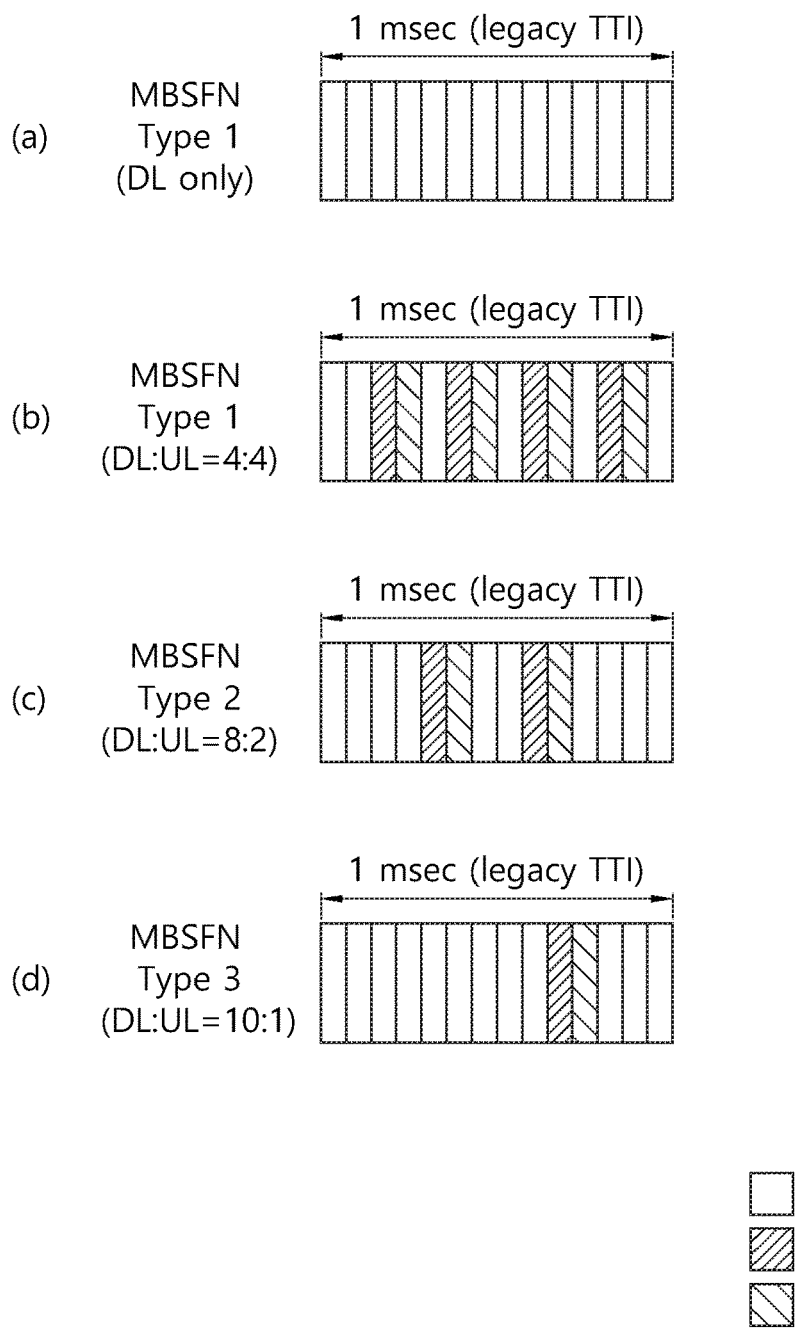
FIG. 22 shows examples of different subframe types of a MBSFN subframe using short TTI for different UL/DL switching patterns according to an embodiment of the present invention.

FIG. 22 shows examples of different subframe types of a MBSFN subframe using short TTI for different UL/DL switching patterns according to an embodiment of the present invention. Referring to FIG. 22, various UL/DL switching patterns may be used for MBSFN subframe using short TTI for different.

Figure 23:
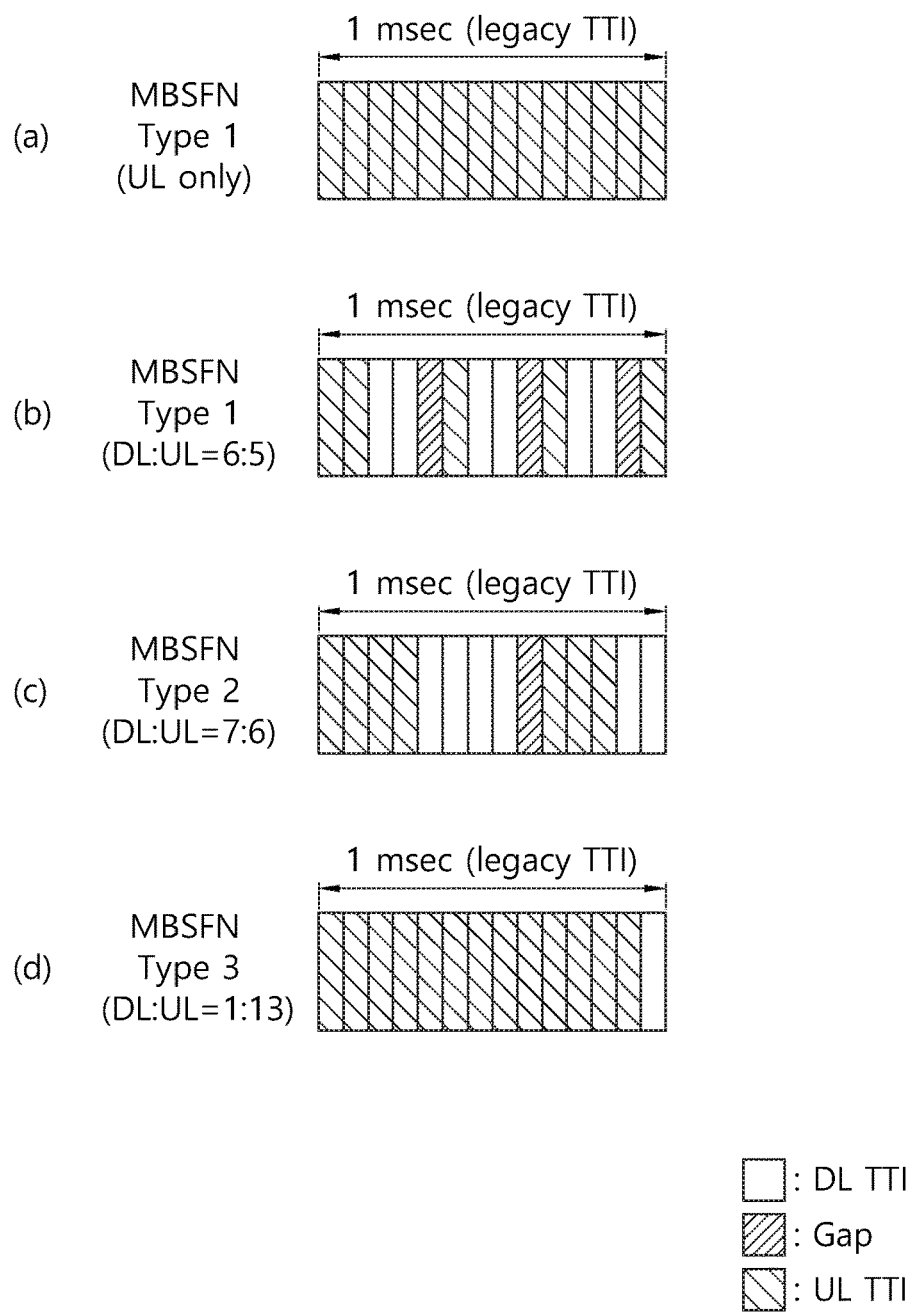
FIG. 23 shows examples of different subframe types of a UL subframe using short TTI for different UL/DL switching patterns according to an embodiment of the present invention.

FIG. 23 shows examples of different subframe types of a UL subframe using short TTI for different UL/DL switching patterns according to an embodiment of the present invention. Referring to FIG. 23, various UL/DL switching patterns may be used for UL subframe using short TTI for different.

For UL subframe or MBSFN subframe, further options with different ratio between DL/UL (from 0:8, 1:7 . . . 8:0) may be considered assuming overlapped OFDM symbols with 2 OFDM symbol lengths TTI size.

Examples described above are potentially different examples of UL/DL switching patterns, which may be used differently based on TTI configurations. Furthermore, there may also be different UL/DL switching patterns if different TTI combination is considered.

Figure 24:
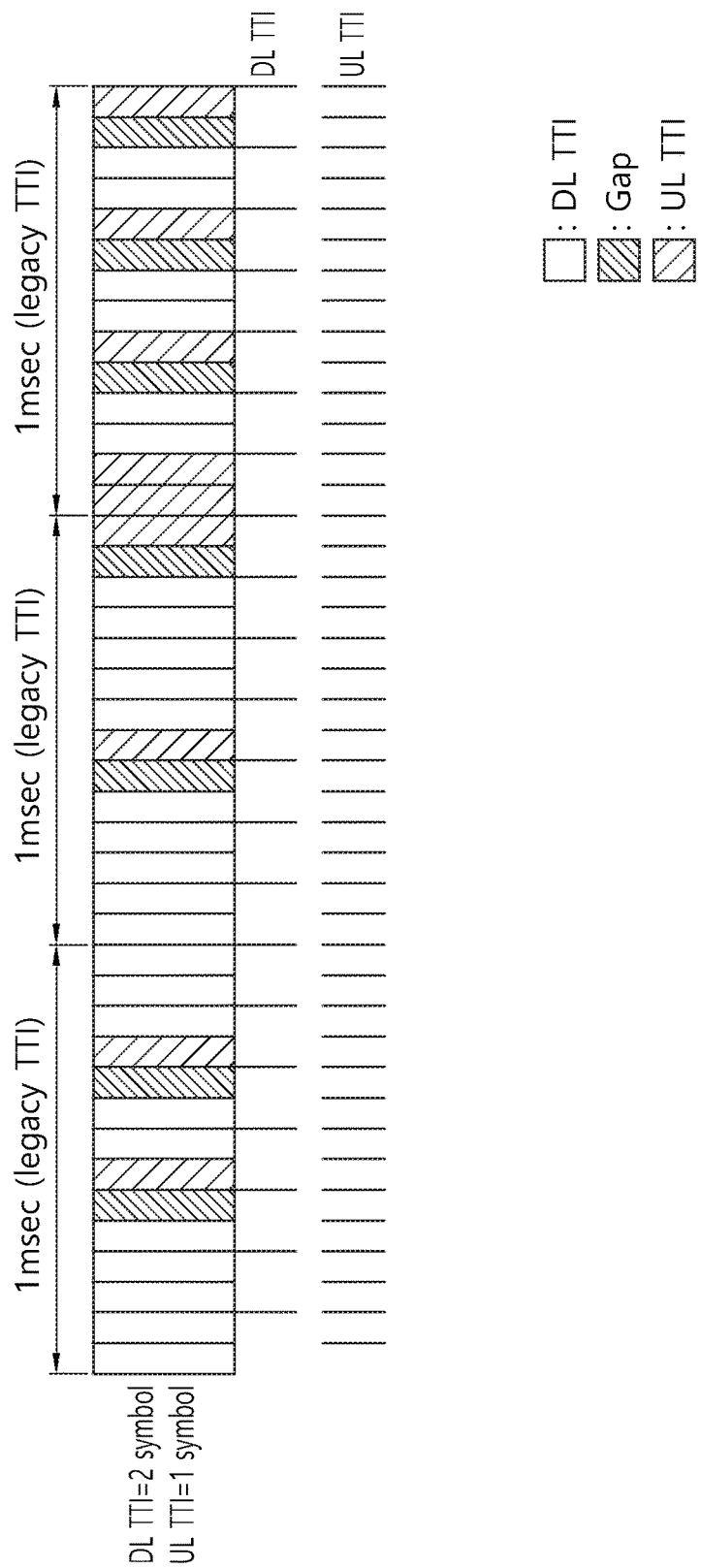
FIG. 24 shows an example of different short DL/UL TTI sizes according to an embodiment of the present invention.

FIG. 24 shows an example of different short DL/UL TTI sizes according to an embodiment of the present invention. Referring to FIG. 24, a size of the short DL TTI is 2 OFDM symbols, and a size of the short UL TTI is 1 OFDM symbol.

The switching pattern may be signaled by higher layer or dynamically via common DCI or some common signaling. The signaling may be transmitted per a few subframes or every subframe. If signaling has been missed, a UE may fallback to default pattern following the configured legacy UL-DL configuration. If there is scheduled UL or PUCCH, the UE may drop if there is no UL portion following fallback pattern. Also, if there is no DL portion by fallback portion, the UE may not be able to acquire common signaling. To alleviate the problem, some DL control portion may be fixed per each TTI, and advanced UEs may assume that DL control may be transmitted in the fixed DL control portions regardless of switching pattern configured by common signaling. In other words, regardless of subframe type, the first two or one OFDM symbols may be used as fixed DL control portion for advanced UEs where UEs may search any DL control or cell common signaling. Otherwise, the common signaling may be transmitted only in DL subframes configured by legacy UL-DL configuration to minimize gap between UEs and the network.

In terms of HARQ, it may be assumed that the latency is signaled by DL grant. One of the following options may be considered to indicate the latency between the corresponding PDSCH and ACK/NACK transmission.

In terms of OFDM symbols: the gap in number of OFDM symbols between PDSCH and PUCCH In terms of the number of UL portions: if there are multiple short TTIs within one UL portion, it may be considered as one if this option is used. ACK/NACK may be transmitted in the first short UL TTI or the first UL control portion in the same region.

In terms of the number of short UL TTIs: if the same size is used for PUCCH and PUSCH, the same value may be used. Otherwise, short TTI length of PUCCH may be used.

In terms of the number of short DL TTIs: if the same size is used for PDCCH and PDSCH, the same value may be used. Otherwise, the short TTI length of PDCCH or PDSCH may be used.

Reference TTI length configured by the network

For PUSCH timing, the similar approach may be used though if different PUCCH and PUSCH TTI size are used. PUSCH TTI length may be used to determine the gap. For PDSCH timing, the gap may be configured between control and data. In this case, similar approaches may be considered where reference TTI may be PDCCH TTI length.

Furthermore, when multiple TTI scheduling is used, DCI may indicate the length of PDSCH or PUSCH transmission. The possible value of length can be (1) 1, 2, 3, 4, 7, 14 OFDM symbols, (2) 1 TTI, 2 TTI, 4 TTI, 8 TTI, or (3) 1, 4, 7, 14 symbols.

From the starting of PDSCH, the TTI length by multiple TTI scheduling may continue where OFDM symbols corresponding to legacy PDCCH control region, gap and/or UL portion, and/or PBCH/PSS/SSS region may be rate matched or punctured. For example, if 4 TTIs are scheduled and TTI size is 3 OFDM symbols, it may span 12 OFDM symbols from the starting of PDSCH where OFDM symbols for legacy PDCCH or configured for UL portion may be rate matched.

To minimize the overhead, if common DCI is introduced which may be applied to delta DCIs of follow-up within a certain duration, HARQ delay or scheduling gap and the number of TTIs may be indicated in the common DCI.

Considering that subframes 0 and 5 are fixed as DL, 50:50 percentage (roughly) between DL and UL portions in TDD may be supported. Different TTI length in different subframe depending on subframe type of legacy UL-DL configuration may be supported.

Figure 25:
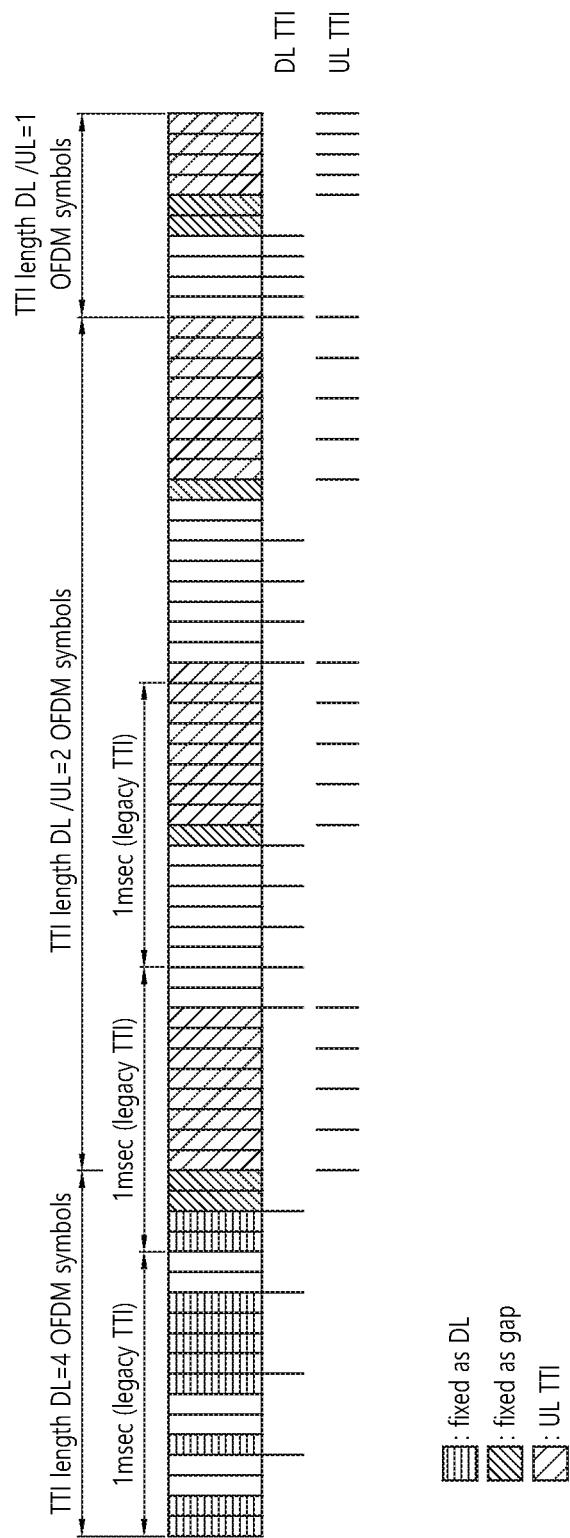
FIG. 25 shows another example of a TDD configuration for short TTI according to an embodiment of the present invention.

FIG. 25 shows another example of a TDD configuration for short TTI according to an embodiment of the present invention. Referring to FIG. 25, UL-DL configuration 1 of 5 ms is used. The same pattern may be repeated in the next 5 ms. This is to protect subframe 0 and 5. If UL-DL configuration 1 is used, the same type may be used or different subframe type may be used in subframe 4.

Figure 26:
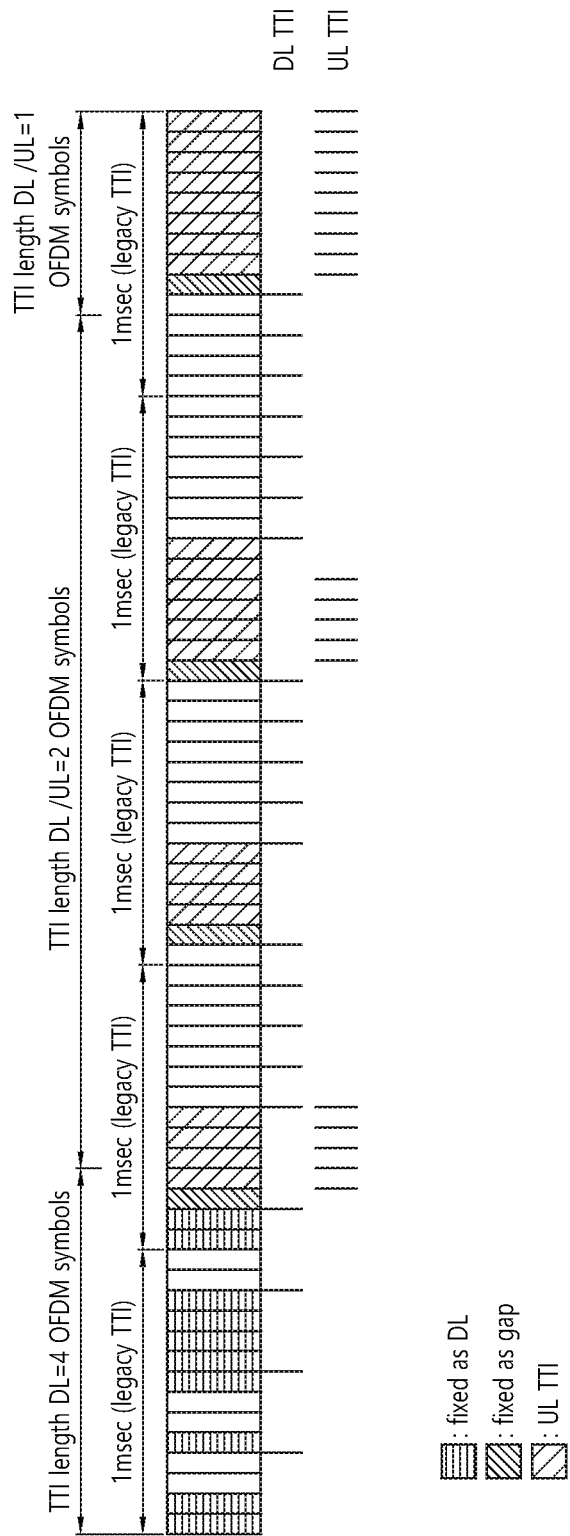
FIG. 26 shows another example of a TDD configuration for short TTI according to an embodiment of the present invention.

FIG. 26 shows another example of a TDD configuration for short TTI according to an embodiment of the present invention. Referring to FIG. 26, UL-DL configuration 2 of 5 ms is used. The same pattern may be repeated in the next 5 ms.

That is, different TTIs may be used in different subframes for DL and UL, respectively. For example, if subframe needs to be used for DL only (e.g. subframe 0/5), TTI length of 4 OFDM symbols may be used for DL. If UL subframes are adjacent each other, TTI length of 2 OFDM symbols may be used for both DL and UL. If the next subframe is DL, DL TTI length of 2 OFDM symbols and UL TTI length of 1 OFDM symbols may be used.

Generally, it is preferred to use large TTI size where legacy TTI needs to be used for DL. One symbol UL control may be used if there is no legacy UE scheduling in such subframes.

For special subframe, to minimize the impact to legacy UEs, the shortened special subframe may be configured. Further, for UL subframe and/or MBSFN subframe, DL TTI length of 2 OFDM symbols and UL TTI length of 1 OFDM symbol may be used. It is desirable to reduce the switching within one legacy TTI or one large TTI to minimize the performance degradation.

The used TTI length per each legacy TTI or long TTI may be configured semi-statistically or dynamically.

Further, nested structure among different TTI lengths may be considered with potentially overlap among different OFDM symbols. For example, DL/UL ratio of 8:0 or 7:1 in normal subframe, DL/UL ratio of 8:0 or 7:1 or 6:2 in MBSFN subframe, and DL/UL ratio of 4:4 or 3:5 in UL subframe may be considered. Or, DL/UL ratio of 8:0 or 7:1 in normal subframe, DL/UL ratio of 9:4 in MBSFN subframe or UL subframe (where DL TTI length of 2 OFDM symbols and UL TTI length of 1 OFDM symbol is used) may be considered. In special subframe, similar mechanism is used, but one less UL TTI may be assumed compared to UL subframe due to 3 OFDM symbols reserved for fixed DL portion.

Though the subframe type may be signaled via common signal per each subframe or subframe groups, it is generally desirable to fix the subframe type per radio frame unit.

Furthermore, DL/UL switching may be allowed in only non-fixed UL subframes. Given potential interference issue to switch DL subframe to special subframe containing UL portion as discussed in enhanced interference mitigation & traffic adaptation (eIMTA), additional DL/UL switching may be allowed only in UL subframes assuming that the network may apply UL-DL configuration 0 for the fixed DL subframes. For this, special subframe type used in flexible UL subframes (commonly) may be configured via common DCI used for eIMTA instead of signaling UL-DL configuration. Or, special subframe type per each flexible UL subframe may be semi-statically configured, and then fixed DL/UL subframes may be dynamically adapted.

Figure 27:
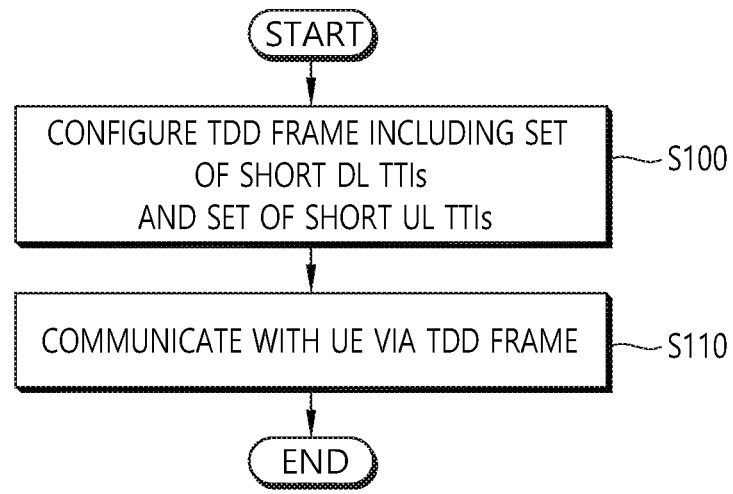
FIG. 27 shows a method for communicating with a user equipment via a TDD frame using a short TTI according to an embodiment of the present invention.

FIG. 27 shows a method for communicating with a user equipment via a TDD frame using a short TTI according to an embodiment of the present invention. The embodiments of the present invention described above may be applied to this embodiment.

In step S100, the eNB configures the TDD frame including a set of short DL TTIs and a set of short UL TTIs. In step S110, the eNB communicates with the UE via the TDD frame. A length of a short DL TTI and a short UL TTI is less than 1 ms.

The TDD frame may be configured based on a legacy UL-DL configuration. The TDD frame may include a fixed DL portion. Or, the TDD frame may be configured in a plurality of carriers. A timing of one carrier among the plurality of carriers may be shifted for other carriers among the plurality of carriers. Or, the TDD frame may be configured a part of a carrier for full-duplex eNB. The other part of the carrier may be used for legacy UEs. Or, the TDD frame may be configured in a complementary carrier which is divided from a legacy carrier. The complementary carrier and the legacy carrier may have different UL-DL configuration from each other. Or, every subframe in the TDD frame may have switching points between the set of short DL TTIs and the set of short UL TTIs.

The present invention described above may be applied to new radio access technology (RAT) as well. The new RAT may not have PDCCH which is transmitted in whole system bandwidth scrambled by cell ID. The new RAT may have at least one beam RS, which is similar to the current CRS, in one cell. The new RAT may have different subcarrier spacing compared to the current subcarrier spacing, mostly 15 kHz. The point is to consider one or more DL/UL switching points in one subframe/long TTI to allow further reduced latency. This may be useful if different applications with different latency requirements coexist (e.g. enhanced mobile broadband (eMBB) or ultra-reliable and low latency communications (URLLC)).

Figure 28:
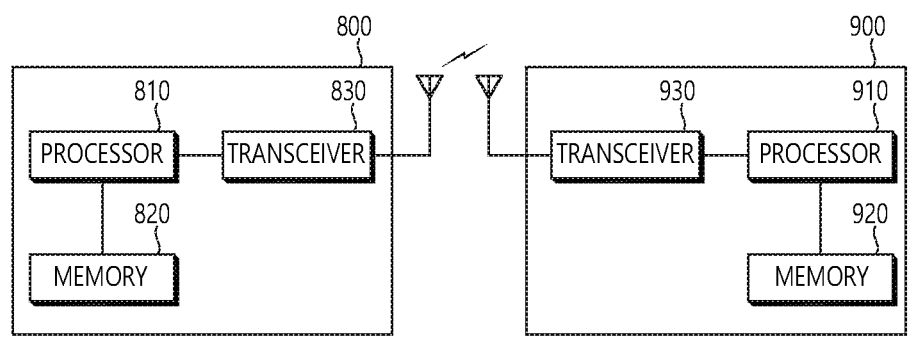
FIG. 28 shows a wireless communication system to implement an embodiment of the present invention.

FIG. 28 shows a wireless communication system to implement an embodiment of the present invention.

An eNB 800 may include a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 may include a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for communicating with a user equipment (UE) in a wireless communication system, the method performed by an eNodeB (eNB) and comprising:
configuring a time division duplex (TDD) frame including a set of short downlink (DL) TTIs and a set of short uplink (UL) TTIs; and
communicating with the UE based on the TDD frame,
wherein a length of a short DL TTI and a length of a short UL TTI are less than 1 ms,
wherein the TDD frame is configured for a complementary carrier, which is located between a first regular carrier and a second regular carrier in a frequency domain,
wherein the complementary carrier, the first regular carrier and the second regular carrier are divided from a legacy carrier, and
wherein the TDD frame includes at least one short DL TTI overlapping with a UL resource allocated for the first regular carrier and the second regular carrier in a time domain.

2. The method of claim 1, wherein the TDD frame is configured based on a legacy UL-DL configuration.

3. The method of claim 2, wherein the TDD frame includes a fixed DL portion.

4. The method of claim 1, wherein the TDD frame is configured for a plurality of carriers.

5. The method of claim 4, wherein a timing of one carrier among the plurality of carriers is shifted for other carriers among the plurality of carriers.

6. The method of claim 1, wherein the TDD frame is configured for a part of a carrier used for full-duplex eNB.

7. The method of claim 6, wherein the other part of the carrier is used for a legacy UE incapable of communicating based on the short DL TTI and the short UL TTI.

8. The method of claim 1, wherein the first regular carrier and the second regular carrier are configured with different UL-DL configuration from the complementary carrier.

9. The method of claim 1, wherein every subframe in the TDD frame has switching points between the set of short DL TTIs and the set of short UL TTIs.

10. An eNodeB (eNB) in a wireless communication system, the eNB comprising:
a memory;
a transceiver; and
a processor operatively coupled to the memory and the transceiver, the processor being configured to:
configure a time division duplex (TDD) including a set of short downlink (DL) transmission time intervals (TTIs) and a set of short uplink (UL) TTIs, and
control the transceiver to communicate with a user equipment (UE) based on the TDD frame,
wherein a length of a short DL TTI and a length of a short UL TTI are less than 1 ms,
wherein the TDD frame is configured for a complementary carrier, which is located between a first regular carrier and a second regular carrier in a frequency domain,
wherein the complementary carrier, the first regular carrier and the second regular carrier are divided from a legacy carrier, and
wherein the TDD frame includes at least one short DL TTI overlapping with a UL resource allocated for the first regular carrier and the second regular carrier in a time domain.

11. The eNB of claim 10, wherein the TDD frame is configured based on a legacy UL-DL configuration.

12. The eNB of claim 11, wherein the TDD frame includes a fixed DL portion.

13. The eNB of claim 10, wherein the TDD frame is configured for a plurality of carriers.

14. The eNB of claim 13, wherein a timing of one carrier among the plurality of carriers is shifted for other carriers among the plurality of carriers.

15. The eNB of claim 10, wherein the TDD frame is configured for a part of a carrier used for full-duplex eNB.

16. The eNB of claim 15, wherein the other part of the carrier is used for a legacy UE incapable of communicating based on the short DL TTI and the short UL TTI.

17. The eNB of claim 10, wherein the first regular carrier and the second regular carrier are configured with different UL-DL configuration from the complementary carrier.

18. The eNB of claim 10, wherein every subframe in the TDD frame has switching points between the set of short DL TTIs and the set of short UL TTIs.

* * * * *